US006078726A

United States Patent [19]
Gotoh et al.

[11] Patent Number: 6,078,726
[45] Date of Patent: *Jun. 20, 2000

[54] RECORDING MEDIUM, AN APPARATUS FOR RECORDING A MOVING IMAGE, AN APPARATUS AND A SYSTEM FOR GENERATING A DIGEST OF A MOVING IMAGE, AND A METHOD OF THE SAME

[75] Inventors: Yukie Gotoh, Hirakata; Makoto Fujimoto, Ibaragi; Hiroshi Akahori, Hirakata; Yo Egusa, Kyoto, all of Japan

[73] Assignee: Matsushita Electric Industrial Co., Ltd., Kadoma, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/725,018

[22] Filed: Oct. 2, 1996

Related U.S. Application Data

[63] Continuation of application No. 08/148,976, Nov. 8, 1993, abandoned.

[30] Foreign Application Priority Data

| Nov. 9, 1992 | [JP] | Japan | 4-298742 |
| Nov. 26, 1992 | [JP] | Japan | 4-317262 |
| Nov. 26, 1992 | [JP] | Japan | 4-317267 |
| Jun. 18, 1993 | [JP] | Japan | 5-147337 |

[51] Int. Cl.$^7$ ............................. H04N 5/76; H04N 5/765
[52] U.S. Cl. .......................................... 386/117; 358/906
[58] Field of Search ............................ 386/46, 107, 117, 386/95, 120, 65, 52, 57, 55, 111, 121; 358/906, 909.1; 352/129

[56] References Cited

U.S. PATENT DOCUMENTS

| 4,400,743 | 8/1983 | Takimoto et al. | 358/335 |
| 4,931,879 | 6/1990 | Koga et al. | 386/111 |
| 4,956,725 | 9/1990 | Kozuki et al. | 386/57 |
| 5,032,905 | 7/1991 | Koga | 358/105 |
| 5,083,860 | 1/1992 | Miyatake et al. | 352/129 |
| 5,097,363 | 3/1992 | Takei et al. | 358/906 |
| 5,099,322 | 3/1992 | Gove | 358/105 |
| 5,157,511 | 10/1992 | Kawai et al. | 358/335 |
| 5,262,867 | 11/1993 | Kojima | 358/906 |
| 5,274,457 | 12/1993 | Kobayashi et al. | 358/906 |
| 5,446,599 | 8/1995 | Lemelson | 358/906 |
| 5,459,582 | 10/1995 | Takahashi | 386/117 |

FOREIGN PATENT DOCUMENTS

| 378393A2 | 7/1990 | European Pat. Off. . |
| 472806A3 | 3/1992 | European Pat. Off. . |
| 489301A1 | 6/1992 | European Pat. Off. . |
| 509208A2 | 10/1992 | European Pat. Off. . |
| 545727A3 | 6/1993 | European Pat. Off. . |
| 60-172892A | 9/1985 | Japan . |
| 5037893A | 2/1993 | Japan . |

OTHER PUBLICATIONS

IBM Technical Disclosure Bulletin, vol. 34, No. 10A, pp. 284–286, Mar. 1992.

*Primary Examiner*—Huy Nguyen
*Attorney, Agent, or Firm*—Renner, Otto, Boisselle & Sklar

[57] ABSTRACT

A system for generating a digest of a moving image includes a generating section for generating a moving image having a plurality of frames, and for generating an operation signal in response to an input received by the generating section during the generating of the moving image; a priority assigning section for assigning a priority to each of the plurality of frames as a function of the operation signal; a selecting section for selecting at least one image of a plurality of images corresponding to the plurality of frames, based on the priority; and an output section for outputting at least one image selected by the selecting section.

6 Claims, 20 Drawing Sheets

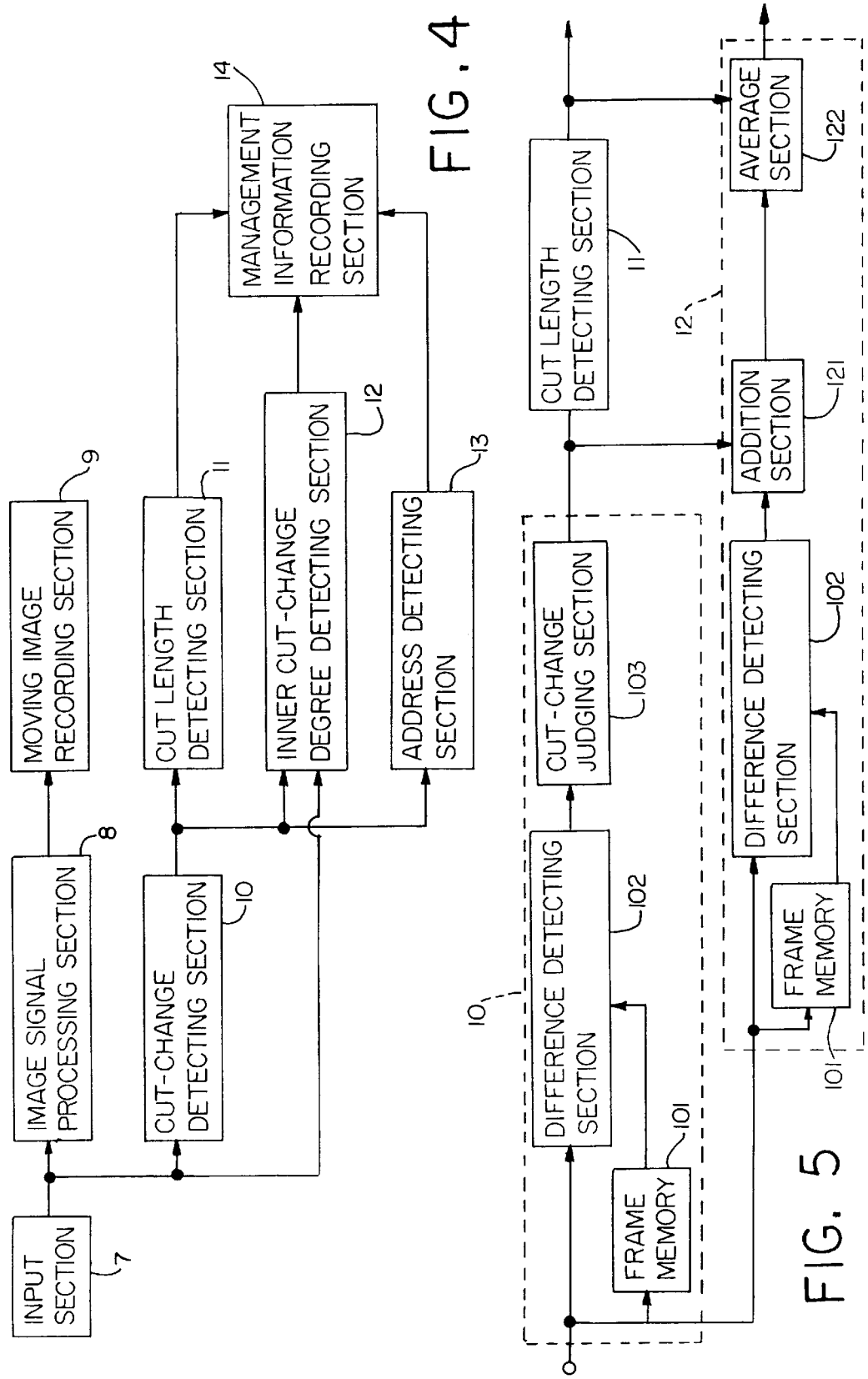

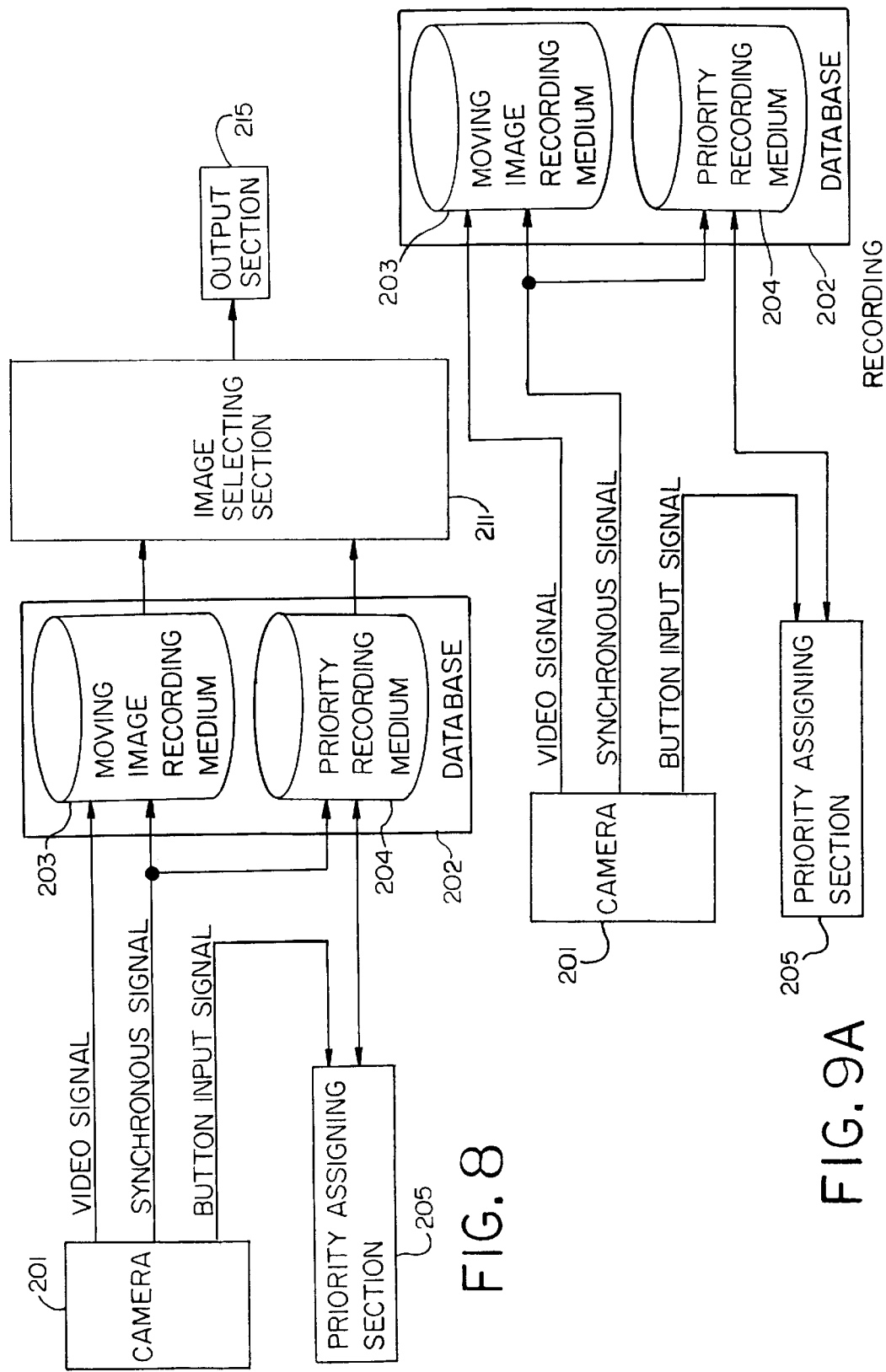

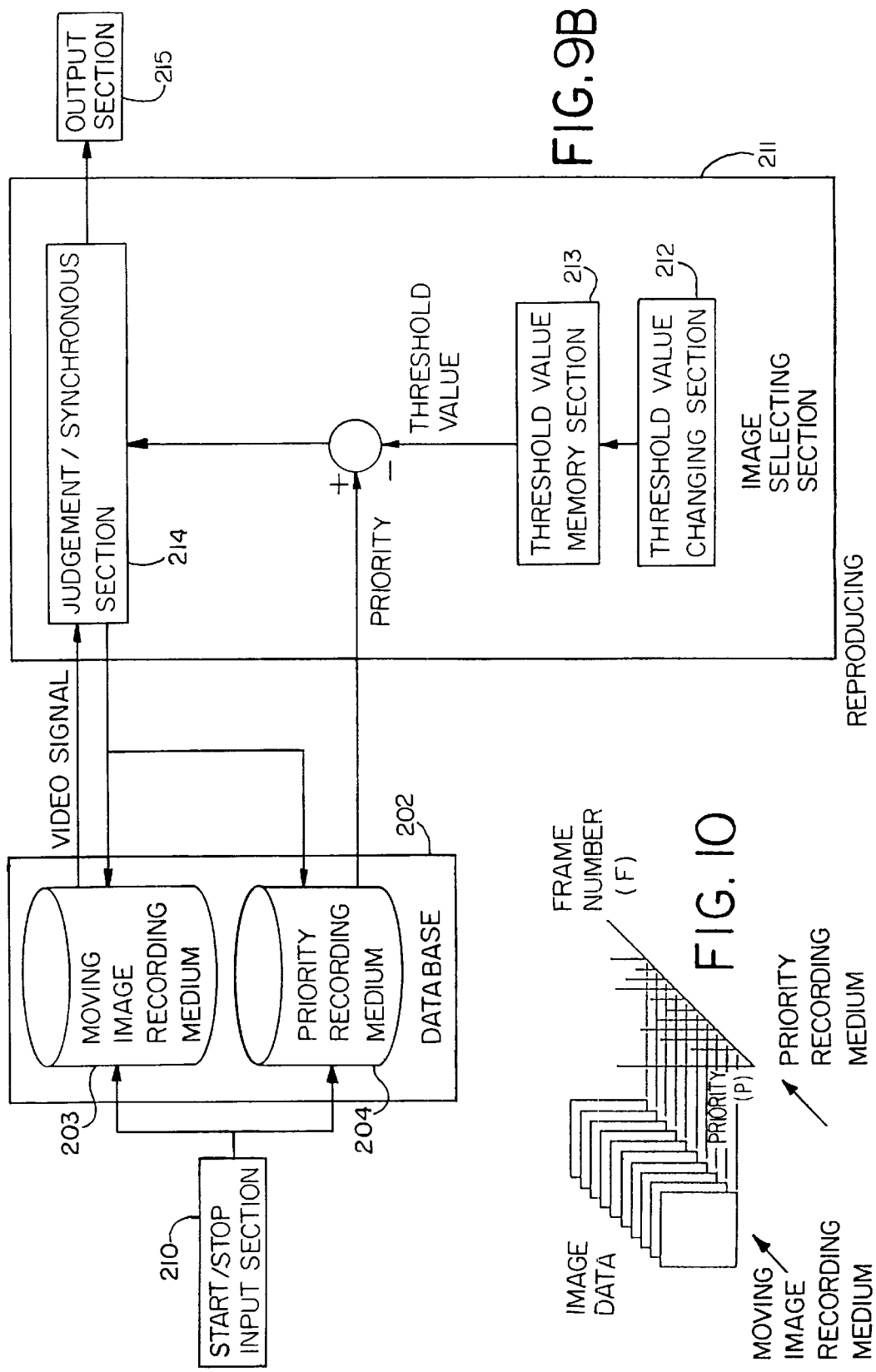

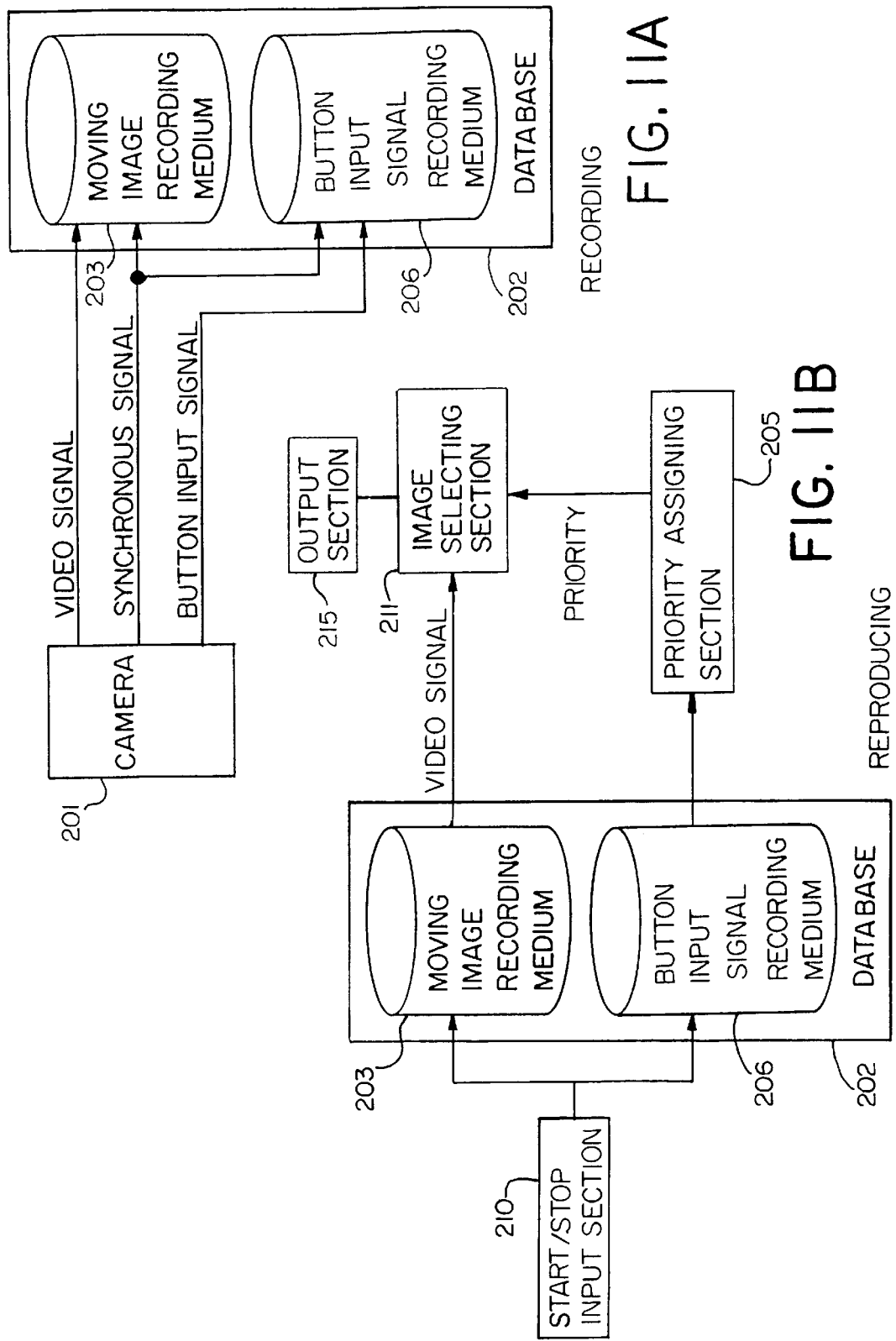

Fc : THE NUMBER OF FRAMES LASTING IN A MODE

ON/OFF: BUTTON INPUT SIGNAL

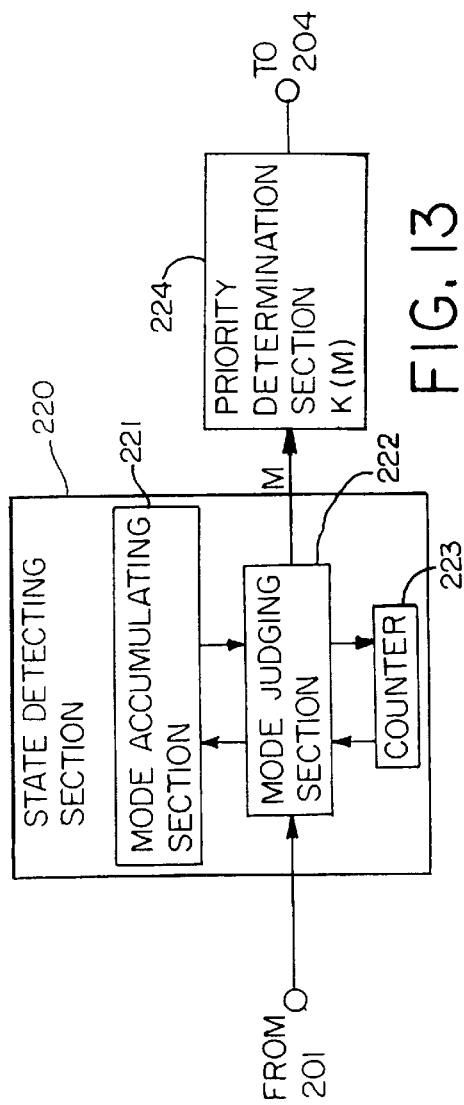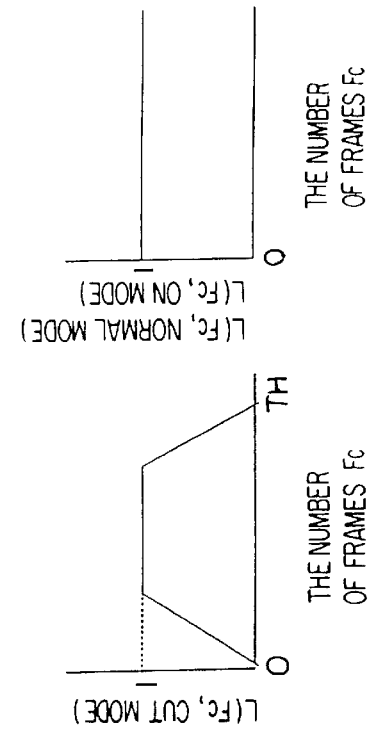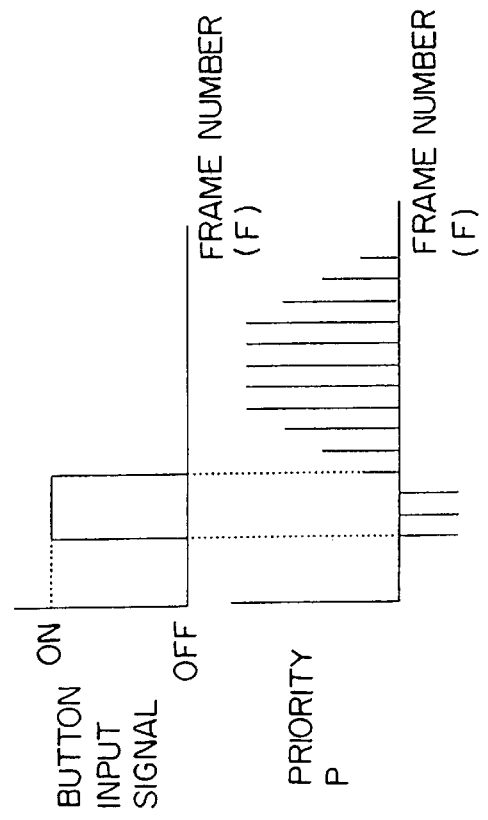
FIG. 13
FIG. 15
FIG. 14

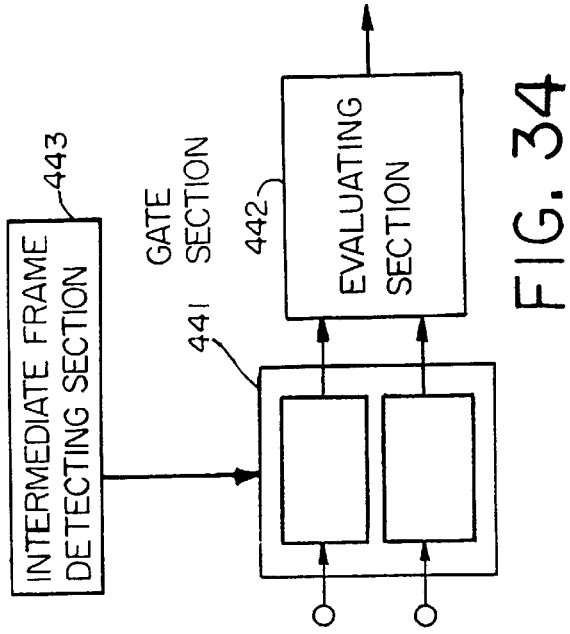
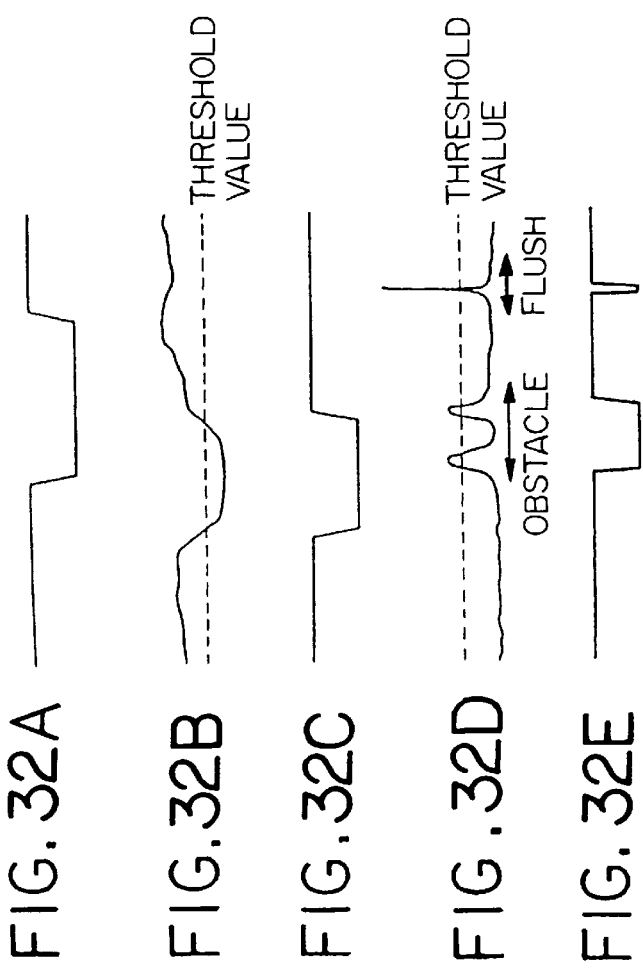
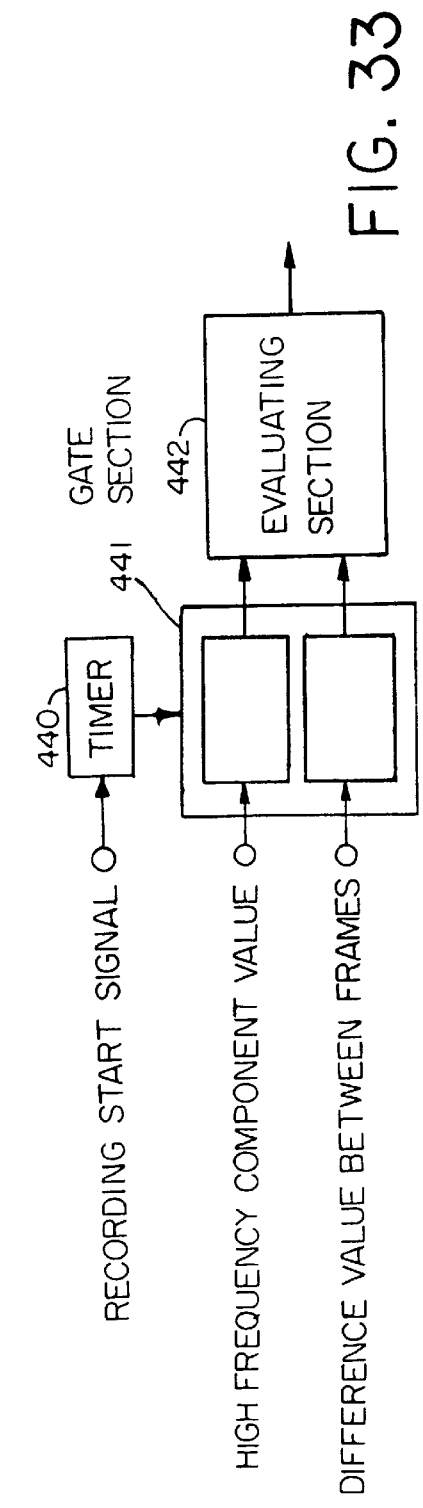

RECORDING MEDIUM, AN APPARATUS FOR RECORDING A MOVING IMAGE, AN APPARATUS AND A SYSTEM FOR GENERATING A DIGEST OF A MOVING IMAGE, AND A METHOD OF THE SAME

This is a continuation of copending application Ser. No. 08/148,976 filed on Nov. 8, 1993, abandoned.

BACKGROUND OF THE INVENTION

1. Field of the Invention

The present invention relates to a recording medium, an apparatus for recording a moving image to the recording medium and an apparatus for generating a digest of the moving image in order to quickly and briefly see the contents of the moving image formed by a video camera or the like. Hereinafter, "a moving image" is referred to as a group of a plurality of static images corresponding to successive frames, regardless of an object being moving or not.

2. Description of the Related Art

Conventionally, as a method for briefly grasping the contents of moving images recorded by a video camera or the like, there have been proposed a method in which images are displayed by using a rapid traverse operation of a video tape recorder (VTR) so that a prescribed number of frames are deleted at regular intervals, and a method in which images are displayed so that the reproduction speed can be manually controlled by using a variable speed reproduction operation of the VTR. However, according to the former method, the prescribed number of frames are deleted irrespective of the contents of the respective frames, so that there arises a problem in that necessary frames may be omitted and unnecessary frames may be displayed despite the user's intent. On the other hand, according to the later method, even though the images can be displayed according to the user's intent, a manual operation is required to be performed for a long time throughout the playback.

Conventionally, as a method for generating digest images for a TV program, etc., there has been proposed a method in which the user previously sees all the recorded images end assigns a priority to each frame of the recorded images, as is disclosed in the Japanese Laid-Open Publication No. 3-90968. The priority in determined by the user's judgment. According to such a method, a digest of the images is displayed within a prescribed period of time. Herein, the priority means a degree of importance of each of the images based on the user's feelings. For example, the priority relates to the degree in which the user want to display the image as a digest compared with the other images and the degree in which the user want to display the image as a digest for a longer period of time. Even though such a method is useful for explaining the contents of the images to the other people, it is not useful to the user who wants to know what kinds of contents the images have recorded. This is because the user can grasp the contents of the images when the user assigns a priority to each of the images.

SUMMARY OF THE INVENTION

A recording medium according to the resent invention includes: a moving image recording portion for recording a moving image having a plurality of cuts; and a management information recording portion for recording management information for managing the moving image recorded into the moving image recording portion; wherein the management information recording portion includes a first portion for storing first information indicating a position at which one of the plurality of cuts is changed to another one of the plurality of cuts in the moving image, and a second portion for storing second information indicating the priority of each of the plurality of cuts in the moving image.

In one embodiment of the invention, the first information is an address on the recording medium, and the second information includes a time length of each of the plurality of cuts, and the degree of the change of the moving image within each of the plurality of cuts.

In another aspect of the present invention, an apparatus for recording a moving image into a recording medium, includes: a management information generating section for receiving a moving image having a plurality of cuts, and for generating first information indicating the position at which one of the plurality of cuts is changed to another one of the plurality of cuts in the moving image, and second information indicating the priority of each of the plurality of cuts in the moving image, based on the moving image; a first recording section for receiving the moving image, and for recording the moving image into a recording medium; and a second recording section for receiving the first information and the second information generated by the management information generating section, and for recording the first information and the second information into the recording medium.

In one embodiment of the invention, the management information generating section includes: a cut change detecting section for detecting an image existing at a position where one of the plurality of cuts is changed to another one of the plurality of cuts in the moving image; a first detecting section for detecting a time length of a cut including the detected image based on the detected image; a second detecting section for detecting the degree of the change of the moving image within a cut including the detected image based on the detected image; and a third detecting section for detecting an address on the recording medium where the detected image is recorded.

In another aspect of the present invention, an apparatus for generating a digest of a moving image, includes an input section for inputting a desired time length of a digest of a moving image having a plurality of cuts; a receiving section for receiving management information for managing the moving image an extracting section for extracting at least one cut from the plurality of cuts in the moving image, based on the desired time length and the management information; a determining section for determining the number of frames to be reproduced for each of the cuts extracted by the extracting section, based on the desired time length and the management information; and a selecting section for selecting an image of a frame determined by the determining section for each of the cuts extracted by the extracting section.

In another aspect of the present invention, a system for generating a digest of a moving image, includes: a generating section for generating a moving image having a plurality of frames, and for generating an operation signal in response to an input received by the generating section during generating the moving image; a priority assigning section for assigning a priority to each of the plurality of frames as a function of the operation signal; a selecting section for selecting at least one image of a plurality of images corresponding to the plurality of frames, based on the priority; and an output section for outputting the at least one image selected by the selecting section.

In one embodiment of the invention, the generating section includes a camera, and the input is supplied to the generating section by the operator of the camera.

In another embodiment of the invention, the system further includes: a section for recording the moving image having the plurality of frames and the priority corresponding to each of the plurality of frames into a recording medium; and a section for reading the moving image having the plurality of frames and the priority corresponding to each of the plurality of frames from the recording medium.

In another embodiment of the invention, the system further includes: a section for recording the moving image having the plurality of frames and the operation signal into a recording medium; and a section for reading the moving image having the plurality of frames and the operation signal from the recording medium.

In another embodiment of the invention, the priority assigning section includes a section for storing a state of an image corresponding to a frame previous to an input current frame; a section for receiving an input operation signal, and determining the state of an image corresponding to the input current frame as a function of the input operation signal and the state of the image corresponding to the previous frame; and a section for determining the priority of the input current frame as a function of the state of the image corresponding to the input current frame.

In another embodiment of the invention, the priority assigning section includes: a plurality of first priority determining sections, each of the plurality of first priority determining sections including a section for storing the state of an image corresponding to the frame previous to an input current frame, a section for receiving an input operation signal and for determining the state of an image corresponding to the input current frame as a function of the operation signal and the state of the image corresponding to the previous frame, and a section for determining the first priority of the input current frame as a function of the state of the image corresponding to the input current frame; a weight calculating section coupled to each of the plurality of the first priority determining section, for calculating the weight for the first priority determined by each of the plurality of the first priority determining section; and a second priority determining section for determining the second priority of the input current frame based on the respective first priorities which are weighted by the weight calculating section.

In another aspect of the present invention, a method for generating a digest of a moving image, includes the steps of: generating a moving image having a plurality of frames; generating an operation signal in response to an input during generating the moving image; assigning a priority to each of the plurality of frames as a function of the operation signal; selecting at least one image of a plurality of images corresponding to the plurality of frames, based on the priority; and outputting the selected at least one image.

In one embodiment of the invention, the priority assigning step includes the steps of: storing a state of an image corresponding to a frame previous to an input current frame; receiving an input operation signal, and determining the state of an image corresponding to the input current frame as a function of the input operation signal and the state of the image corresponding to the previous frame; and determining a priority of the input current frame as a function of the state of the image corresponding to the input current frame.

In another embodiment of the invention, the priority assigning step includes the steps of: (a) determining a first priority corresponding to a current frame as a function of each of a plurality of input operation signals; (b) calculating the weight for each of the first priorities obtained by step (a); and (c) determining a second priority corresponding to the current frame based on the first priorities weighted by the step (b).

In another aspect of the present invention, an apparatus for recording a moving image into a recording medium, includes: a generating section for generating a moving image having a plurality of frames, and for generating an operation signal in response to an input received by the generating section during generating the moving image; a priority assigning section for assigning a priority to each of the plurality of frames as a function of the operation signal; a recording section for the moving image having the plurality of frames and the priority assigned to each of the plurality of frames into a recording medium.

In another aspect of the present invention, an apparatus for generating a digest of a moving image, includes: a priority assigning section for receiving an operation signal generated during generating a moving image having a plurality of frames, and assigning a priority to each of the plurality of frames as a function of the operation signal; a selecting section for receiving the moving image, and for selecting at least one image of a plurality of images corresponding to the plurality of frames, based on the priority; and an output section for outputting at least one image selected by the selecting section.

In another aspect of the present invention, an apparatus for generating a digest of a moving image, includes: a motion vector detecting section for receiving a moving image having a plurality of frames, and for detecting a motion vector between a predetermined number of frames of the plurality of frames; a calculating section for calculating at least one of the values of a zooming factor, the value of a rotation vector, a change degree of the zooming factor between the predetermined number of frames, and a change degree of the rotation vector between the predetermined number of frames, based on the motion vector; a shot breakpoint detecting section for detecting a shot breakpoint of the moving image, based on at least one of the value of the zooming factor, the value of the rotation vector, the change degree of the zooming factor between the predetermined number of frames and the change degree of the rotation vector between the predetermined number of frames; a selecting section for selecting at least one image of a plurality of images corresponding to the plurality of frames, based on the shot breakpoint; and an output section for outputting at least one image selected by the selecting section.

In one embodiment of the invention, the moving image having a plurality of frames is recorded in a recording medium, and the motion vector detecting section includes a section for reading the moving image from the recording medium.

In another embodiment of the invention, the calculating section includes a section for recording at least one of the values of the zooming factor, the value of the rotation vector, the change degree of the zooming factor between the predetermined number of frames, and the change degree of the rotation vector between the predetermined number of frames into a recording medium, and the shot breakpoint detecting section includes a section for reading at least one of the values of the zooming factor, the value of the rotation vector, the change degree of the zooming factor between the predetermined number of frames, and the change degree of the rotation vector between the predetermined number of frames from the recording medium.

In another aspect of the present invention, a recording medium, includes: a moving image recording portion for recording a moving image; and a management information recording portion for recording at least one of the camera operation information obtained by detecting a camera operation made by the operator during the recording of the moving image by the use of a camera, image processing information obtained by processing the moving image, and sensing information obtained by detecting a recording condition during the recording of the moving image by the use of a sensor provided in the camera.

In another aspect of the present invention, an apparatus for generating a digest of a moving image, includes: an information receiving section for receiving at least one of a camera operation information and an image processing information, the camera operation information being obtained by detecting a camera operation made by an operator during the recording of a moving image by the use of a camera, the image processing information being obtained by processing the moving image; a static image extracting section for detecting the time period from the recording start to the recording end based on at least one of the camera operation information and the image processing information, and extracting at least one static image of a plurality of static images included in the moving image recorded during the time period from the recording start to the recording end based on at least one of the camera operations information and the image processing information; and an output section for outputting at least one static image extracted by the extracting section.

In one embodiment of the invention, the information receiving section further receives a sensing information obtained by detecting a recording condition during the recording of the moving image by the use of a sensor provided in the camera, and the static image extracting section extracts at least one static image of the plurality of static images included in the moving image recorded during the time period from the recording start to the recording end based on at least one of the camera operation information, the image processing information and the sensing information.

In another aspect of the present invention, an apparatus for recording a moving image onto a recording medium, includes: an information acquiring section for acquiring at least one of a camera operation information and an image processing information, the camera operation information being obtained by detecting a camera operation made by an operator during the recording of a moving image by the use of a camera, the image processing information being obtained by processing the moving image; a specifying section for detecting the time period from the recording start to the recording end based on at least one of the camera operation information and the image processing information, for specifying at least one static image of a plurality of static images included in the moving image recorded during the time period from the recording start to the recording end based on at least one of the camera operation information and the image processing information, and for generating information on the specified at least one static image; and a recording section for recording the moving image and the information on the specified at least one static image into a recording medium.

In one embodiment of the invention, the information acquiring section further acquires a sensing information obtained by detecting a recording condition during the recording of the moving image by the use of a sensor provided in the camera, and the specifying section specifies at least one static image of the plurality of static images included in the moving image recorded during the time period from the recording start to the recording end based on at least one of the camera operation information, the image processing information and the sensing information.

In another aspect of the present invention, a method for generating a digest of a moving image, includes the steps of: receiving at least one of a camera operation information and an image processing information, the camera operation information being obtained by detecting a camera operation made by an operator during the recording of a moving image by the use of a camera, the image processing information being obtained by processing the moving image; detecting the time period from the recording start to the recording end based on at least one of the camera operation information and the image processing information; extracting at least one static image of a plurality of static images included in the moving image recorded during the time period from the recording start to the recording end based on at least one of the camera operation information and the image processing information; and outputting the extracted at least one static image.

In one embodiment of the invention, the receiving step includes receiving a sensing information obtained by detecting a recording condition during the recording of the moving image by the use of a sensor provided in the camera, and the extracting step includes extracting at least one static image of the plurality of static images included in the moving image recorded during the time period from the recording start to the recording end based on at least one of the camera operation information, the image processing information and the sensing information.

Thus, the invention described herein makes possible the advantages of (1) providing a recording medium capable of being used when a digest of a moving image is generated and displayed, (2) providing an apparatus for recording a moving image into a recording medium capable of automatically generating a management information for managing a moving image and recording the management information into the recording medium, (3) providing an apparatus and a system for generating and displaying a digest of a moving image capable of reflecting the user's intent during the recording of the moving image, so that the contents of the moving image can be quickly and briefly grasped.

These and other advantages of the present invention will become apparent to those skilled in the art upon reading and understanding the following detailed description with reference to the accompanying figures.

BRIEF DESCRIPTION OF THE DRAWINGS

FIG. 4 is a block diagram showing a structure for an apparatus for recording a moving image according to a third example of the present invention.

FIG. 5 is a block diagram showing structures for a cut-change detecting section and an inner cut image change degree detecting section according to the third example.

FIG. 8 is a block diagram showing a structure for a system for generating a digest of a moving image according to a fifth example of the present invention.

FIG. 9A is a block diagram showing a structure for a part of the system according to the fifth example.

FIG. 9B is a block diagram showing a structure for another part of the system according to the fifth example.

FIG. 10 is a view for illustrating a relationship between image data, priority and frame number.

FIG. 11A is a block diagram showing a structure of a part of the system according to the fifth example.

FIG. 11B is a block diagram showing a structure of another part of the system according to the fifth example.

FIG. 13 is a block diagram showing a structure for a priority assigning section.

FIG. 14 is a view for illustrating how the priority of a mode is changed by a number of successive frames.

FIG. 15 shows the relationship between the mode and the number of the successive frames.

FIGS. 32A to 32E show waveforms of signals generated by the gate signal generating section according to the tenth example.

FIG. 33 shows a structure for a representative image extracting section according to a tenth example of the present invention.

FIG. 34 shows a structure for another representative image extracting section according to a tenth example of the present invention.

DESCRIPTION OF THE PREFERRED EMBODIMENTS

Hereinafter, the present invention will be described by way of illustrating examples.

EXAMPLE 1

Figure 1:
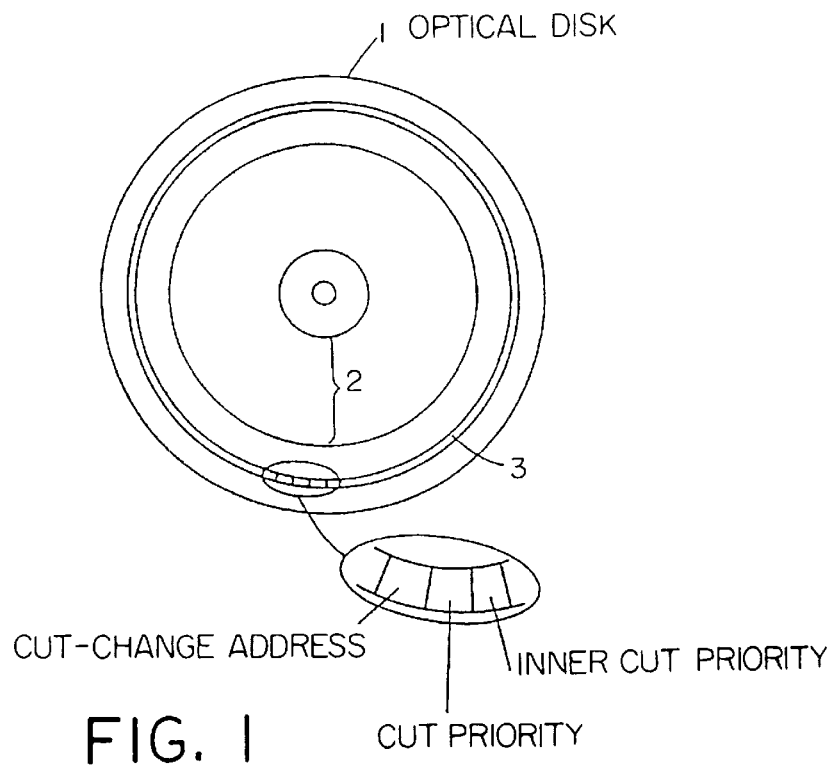
FIG. 1 shows a recording medium according to a first example of the present invention.

FIG. 1 shows a recording medium according to a first example of the present invention. The recording medium is, for example, an optical disk 1. The optical disk 1 includes a plurality of tracks 2 for recording a moving image and at least one track 3 for recording management information for managing the moving image recorded in the optical disk 1. Track 3 includes a portion for recording a positional information indicating the position at which a cut is switched to another cut in the moving image and the priority information indicating the degree of priority of each cut included in the moving image. For example, the positional information include a "cut-change address" of the tracks 2 of the optical disk 1. The priority information includes a "cut priority" and an "inner cut priority". The terms of the "cut-change address", the "cut priority" and the "inner cut priority" are defined in the next paragraph.

Figure 2:
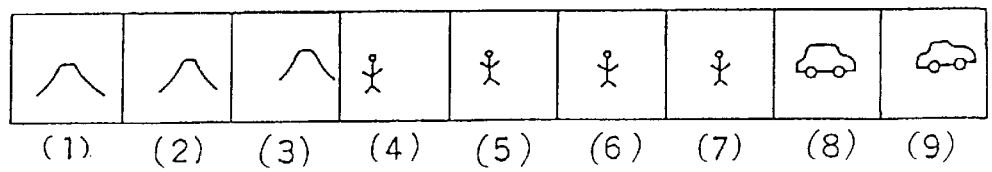
FIG. 2 shows an example of a moving image including a plurality of frames.

As is shown in FIG. 2, the moving image consists of a plurality of frames of static images, each of which is recorded as an analog signal or a digital signal in the tracks 2 of the optical disk 1. "A cut" is defined as a group of successive static images from a frame at which an input of a recording start is received by the imaging device to a frame at which an input of a recording end is received by the imaging device. "A cut-change image" is defined as a frame of static image at which a cut is switched to another cut. For example, in FIG. 2, it is assumed that a first cut representing a mountain consists of frames (1) to (3), a second cut representing a human body consists of frames (4) to (7), and a third cut representing a car consists of frames (8) and (9). In this case, the frames (4) and (8) are cut-change images, respectively. The contents of images are changed between the frames (3) and (4), and are changed between the frames (7) and (8). An address of the tracks 2 at which the cut-change image is recorded is hereinafter referred to as a "cut-change address". A length of a cut, i.e. the number of frames of a cut, is hereinafter referred to as a "cut priority". For example, in FIG. 2, the cut priorities of the first, second and third cuts are 3, 4 and 2, respectively. The degree of the change within a cut is hereinafter referred to as an "inner cut priority". For example, the inner cut priority is represented by a mean value of the differences between frames included in the same cut. Specifically, the inner cut priority is obtained by calculating the difference in a signal between the frames for each of corresponding pixels, by summing up the difference over all corresponding pixels so as to be the summed up difference as a frame difference value, and by calculating the mean value of the frame differences value for all adjacent frames included in the same cut. Such an inner cut priority represents an average degree of the change of images between the frames in a cut. Accordingly, a cut having a higher degree of the change of images means a cut in which the frames of images are changed in motion more drastically. The cut-change address, the cut priority and the inner cut priority are recorded in track 3 of the optical disk 1.

By recording the management information to the recording medium, it makes possible to easily access a moving image recorded in the recording medium. For example, if only cuts having a prescribed value or more of the cut priority are selected from a moving image based on the management information and the selected cuts are displayed in a display apparatus, then one can quickly and briefly see the contents of the moving image which is recorded in the recording medium. In addition, one can easily find out the desired scene among the moving images based on the selected cuts. This is because a cut having a large value of the cut priority can be considered to be representative of the contents of the entire moving image. Thus, one can roughly see the contents of the entire moving image, for example, by extracting one frame from each cut having a large value of the cut priority and by displaying the extracted frames in a display apparatus. Further, if only cuts having a prescribed value or more of the inner cut priority are selected from a moving image based on the management information and the selected cuts are displayed in a display apparatus, then one can know the portion where the contents of images are drastically changed in motion among the moving image recorded in the recording medium.

As is described above, the recording medium of the first example of the present invention includes a portion for recording a management information for managing a moving image recorded in the recording medium, so that a user can readily find a desired scene.

In the present example, the inner cut priority in represented by a mean value of the differences between frames in the same cut, and the differences between the frames are determined on the basis of the luminance values of the corresponding pixels between the frames. However, the inner cut priority may be obtained without using the differences between the frames nor the luminance values. For example, if a screen is divided into a plurality of blocks, and a motion vector for each of the plurality of blocks is calculated, the degree of variance of the motion vectors can be used as the inner cut priority.

In the present example, the record medium is an optical disk. However, the recording medium according to the present invention is not limited to the optical disk. The present invention is also applicable to other types of recording mediums such as a solid memory like IC, a magnetic tape, or the like.

EXAMPLE 2

Figure 3:
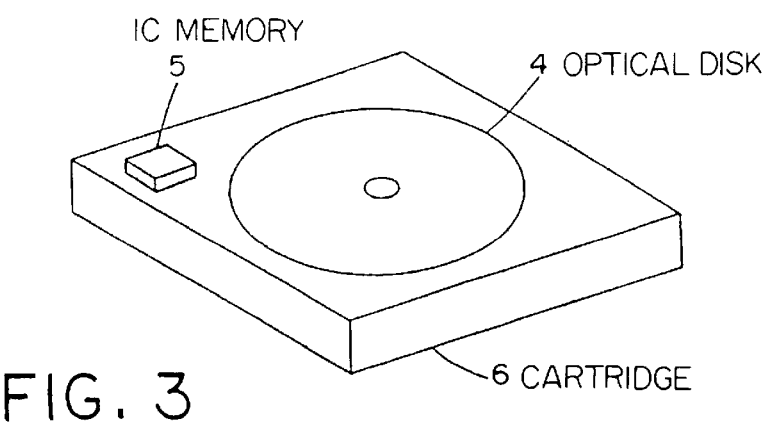
FIG. 3 shows a recording medium according to a second example of the present invention.

FIG. 3 shows a recording medium according to a second example of the present invention. The is recording medium includes a first recording medium for recording a moving image and a second recording medium for recording a management information for managing the moving image recorded in the first recording medium. The first and second recording mediums are separated each other, which is different from the first example of the present invention. For example, as shown in FIG. 3, the recording medium includes an optical disk 4 for recording a moving image, an IC memory 5 for recording a management information for managing the moving image recorded in the optical disk 4, and a cartridge 6 for housing the optical disk 4 and the IC memory 5. The management information to be recorded in the IC memory is the same as that of the first example, and the description thereof is omitted.

According to the recording medium of the present example, the management information is recorded in the medium other than the medium for recording the moving image information, thereby making it possible to access the moving image quickly when the recorded moving image is reproduced.

EXAMPLE 3

FIG. 4 shows a configuration of an apparatus for recording a moving image according to a third example of the present invention. The apparatus includes an input section 7, an image signal processing section 8, a moving image recording section 9, a cut-change detecting section 10, a cut length detecting section 11, an inner cut-change degree detecting section 12, an address detecting section 13, and a management information recording section 14.

An operation of the apparatus having the above configuration will be described below. A signal representing a moving image is input to the input section 7. The input signal is conveyed to the image signal processing section 8 and the cut-change detection section 10. The image signal processing section 8 modulates the input signal into a signal which is suitable for a recording medium. The modulated signal is recorded in the recording medium by the moving image recording section 9. The cut-change detecting section 10 receives the input signal and detects a cut-change image at which a out is changed into another cut in the moving image based on the input signal. A detecting signal representing a position of the cut-change image in the moving image is supplied to the cut length detecting section 11, the inner cut-change degree detecting section 12 and the address detecting section 13, respectively. The cut length detecting section 11 detects the length of a cut in response to the detecting signal. The length of a cut is determined by counting the number of frames included in the cut. The inner cut-change degree detecting section 12 detects the degree of the change between the frames included in the cut in response to the detecting signal. The address detecting section 13 detects the address of the recording medium at which the cut-change image detected by the cut-change detecting section 10 is recorded in response to the detecting signal. The management information recording section 14 records the length of the cut, the degree of the change and the address of the cut-change image in the recording medium as a management information for managing the moving image recorded in the recording medium.

Next, a further detail configuration of the cut-change detecting section 10 and the inner cut-change degree detecting section 12 will be described with reference to FIG. 5. The cut-change detecting section 10 includes a frame memory 101 for delaying an input signal representing a moving image by one frame, a difference detecting section 102 for calculating the difference between successive frames, and a cut-change judging section 103 for judging whether a cut-change occurs or not by comparing the difference between the successive frames within a predetermined value. The cut-change judging section 103 judges that a cut-change occurs if the difference between the frames is equal to, or greater than the predetermined value. The inner cut-change degree detecting section 12 includes the frame memory 101 for delaying the input signal by one frame, the difference detecting section 102 for calculating the difference between successive frames, an addition section 121 for summing up the differences between the frames in the same cut, and an average section 122 for calculating the mean value of the summed differences between the frames in the same cut by dividing the sum of differences between the frames obtained by the adding section, 121 by the number of frames detected by the cut length detecting section 11. For example, a luminance value and rgb value can be used as a signal for calculating the difference between the successive frames. By providing the configurations shown in FIG. 5, the cut-change detecting section 10 judges that a cut-change occurs at the portion where the difference of the adjacent frames is large, since it is likely to greatly change the contents of the adjacent frames at that portion. The inner cut-change degree detecting section 12 calculates the mean value of the summed differences between the successive frames within the cut as the degree in the change between the successive frames.

Figure 6:
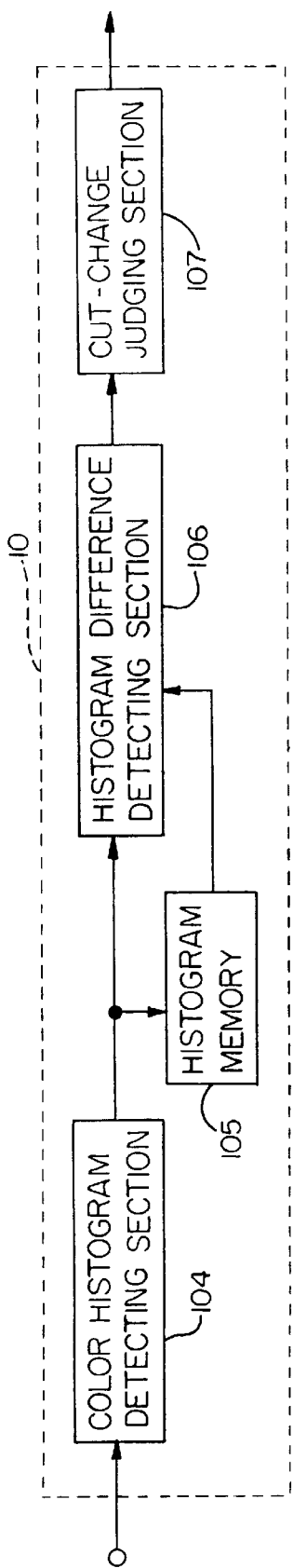
FIG. 6 is a block diagram showing another structure for the cut-change detecting section according to the third example.

FIG. 6 shows another configuration of the cut-change detecting section 10. In FIG. 6, the cut-change detecting section 10 includes a color histogram detecting section 104 for detecting a color histogram of an input signal representing a moving image for every frame, a histogram memory 105 for recording the detected color histogram, a histogram difference detecting section 106 for detecting the difference of color histograms between the respective successive frames, and a cut-change judging section 107 for judging whether a cut-change occurs or not by comparing the difference of the color histograms between the succesive frames within a predetermined value. The cut-change judging section 107 judges that a cut-change occurs if the difference of the color histograms between the frames is equal to, or greater than the predetermined value. In the cut-changer detecting section 10 shown in FIG. 6, a color histogram in a frame is used as a signal for detecting a cut-change, so that the cut-change detecting performance will not be affected by the change between the frames.

Thus, according to the apparatus for recording a moving image mentioned above, the management information for managing the moving image is automatically generated from the input moving image and is recorded into a recording medium at the same time when the moving image is recorded into the recording medium. Specifically, the apparatus automatically detects a cut-change image among the moving image, detects the address of the recording medium at which the cut-change image is recorded, the time length of each cut, and the degree of the change between the frames in each cut, and records the address of the cut-change, the time length of each cut and the degree of the change between frames in each cut into the recording medium as managing information. This makes it possible to add the management information to a large amount of moving image data without any human help or assistance.

EXAMPLE 4

Figure 7:
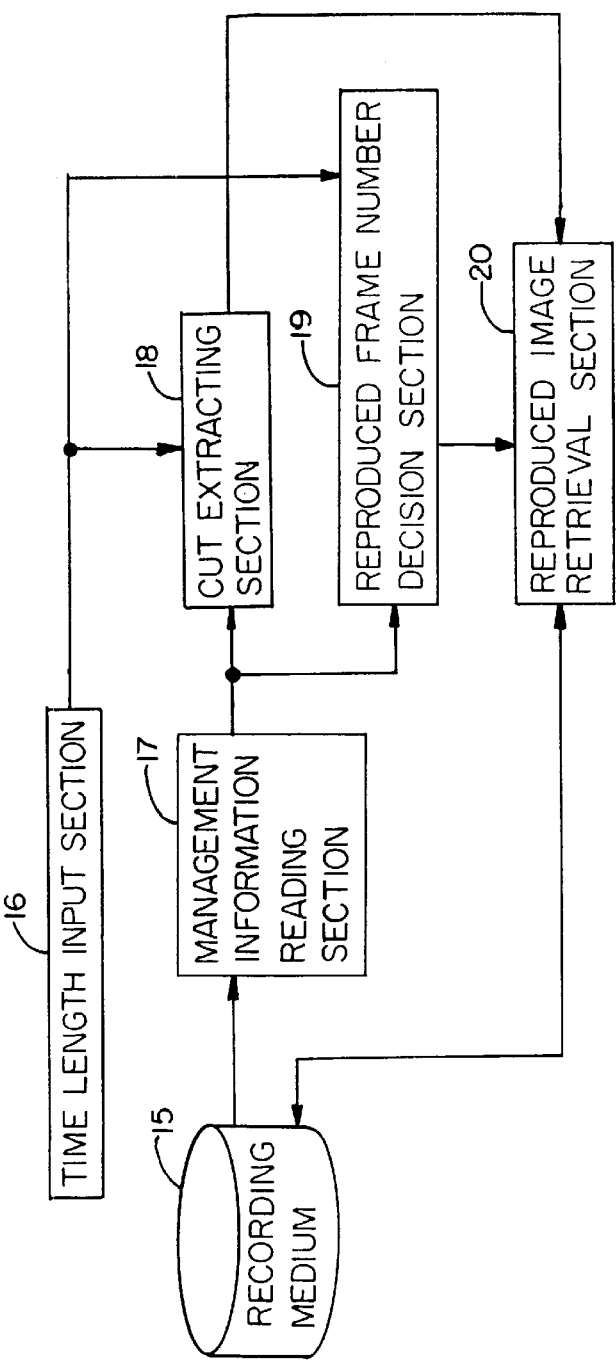
FIG. 7 is a block diagram showing a structure for an apparatus for generating a digest of a moving image according to a fourth example of the present invention.

FIG. 7 shows a configuration of an apparatus for generating a digest of a moving image according to a fourth example of the present invention. The apparatus includes a time length input section 16, a management information reading section 17, a cut extracting section 18, a reproduced frame number decision section 19, and a reproduced image retrieval section 20.

Next, the operation of the apparatus having the above configuration will be described. A management information for managing a moving image, as well as the moving image, is recorded in a recording medium 15, as described in the first and second examples.

The apparatus generates a digest of a moving image having arbitrary time length specified by a user based on the management information. The management information reading section 17 reads a management information from a recording medium. Alternatively, the management information reading section 17 may receive the management information from any device such as an imaging device instead of reading the management information from the recording medium. The management information includes an address at which cut-change images is recorded, the length of a cut and the degree of the change in a cut.

The desired time length of a digest of the moving image is input to the time length input section 16. The input time length is conveyed to the cut extracting section 18 and the reproduced frame number decision section 19. The cut extracting section 18 extracts at least one cut from the plurality of cuts included in the moving image based on the management information and the input time length. The reproduced frame number decision section 19 determines the number of frames to be reproduced for each of the extracted cuts based on the management information and the input time length. Finally, the reproduced image retrieval section 20 retrieves frames for each of the cuts extracted by the cut extracting section 18 from the recording medium 15 in accordance with the number of frames to be reproduced for each of the extracted cuts determined by the reproduced frame number decision section 19.

Hereinafter, the operations of the cut extracting section 18 and the reproduced frame number decision section 19 will be described in detail. Herein, n denotes the number of cuts included in the moving image which is recorded in the recording medium, T (sec.) denotes the time length input to the time length input section 16 by the user, and m denotes the minimum number of frames of respective cuts required to be seen as a animated film.

As a first case, it is assumed that the input time length T is short. Specifically, it is assumed that the input time length T satisfies the following relationship shown in the equation (1).

$$T \leq n \cdot m \cdot t \tag{1}$$

wherein, t denotes the time interval between respective two frames.

In this case, if the cut extracting section 18 extracts m frames from each of cuts included in the moving image, the time length of a digest consisting of the extracted frames would exceed the input time length T. In order to restrict the time length of the digest within the input time length T, the cut extracting section 18 determines the number of cuts n' to be extracted in accordance with the following equation (2).

$$n'=T/(m \cdot t) \qquad (2)$$

If the number n' is not an integral value, the number n' is rounded up or down so as to be an integral value.

The cut extracting section 18 determines the number n' in accordance with the equation (2), and then extracts n' cuts which have a longer time length from the n cuts included in the moving image in the order from a cut having the longest time length to a cut having the shortest time length, based on the management information which is read from the recording medium 15. The reproduced frame number decision section 19 determines to make the number of frames to be reproduced for each of the extracted n' cut to be m. Then, the reproduced image retrieval section 20 retrieves m frames of the respective n' cuts from the recording medium 15 based on addresses of n' cut-change images extracted by the cut extracting section 18.

As a second case, it is assumed that the input time length T is long. Specifically, it is assumed that the input time length T satisfies the following relationship shown in the equation (3).

$$T > n \cdot m \cdot t \qquad (3)$$

In this case, even if the cut extracting section 18 extracts m frames from each of the n cuts included in the moving image, the time length of a digest consisting of the extracted frames is shorter than the input time length T. Accordingly, the number of frames m' to be further extracted from the n cuts is determined in accordance with the following equation (4).

$$m'=T/t-n \cdot m \qquad (4)$$

The reproduced frame number decision section 19 determines the number m' in accordance with the equation (4), and then determines the number of frames $m_i'$ to be reproduced for each of the n cuts, in accordance with the following equation (5).

$$m_i' = m + m' \cdot x_i \Big/ \sum_{l=1}^{n} x_l \qquad (5)$$

wherein, i denotes an identifier to identify each cut, and $x_i$ denotes the degree of the image change within the ith cut. If the number $m_i'$ is not an integral value, the number $m_i'$ is rounded up or down so as to be an integral value. Then, the reproduced image retrieval section 20 retrieves $m_i$ frames of the respective n cuts from the recording medium 15 based on the addresses of the n cut-change images extracted by the cut extracting section 18.

According to the apparatus of this example of the present invention, it is possible to automatically generate a digest having a time length desired by the user for a rapid traverse operation, based on the input desired time length of the digest and the management information.

EXAMPLE 5

FIG. 8 shows a configuration of a system for generating a digest of a moving image according to a fifth example of the present invention. The system calculates the priority of each frame and records the priority in a recording medium during making a moving image by the use of a camera. Then, the system selects at least one frame of the frames included in the moving image based on the priority recorded in the recording medium and displays images corresponding to the selected frames as a digest of the moving image. For this reason, first the operation of the system in making a moving image will be described with reference to FIG. 9A and the second operation of the system in displaying a digest of the moving image will be described with referring to FIG. 9B.

FIG. 9A shows a part of the configuration of the system for generating a digest of a moving image. This part calculates the priority of each frame and records the priority in a recording medium during making a moving image by the use of a camera.

In FIG. 9A, the system includes a camera 201 for outputting a video signal, a vertical/horizontal scan synchronous signal, and a button input signal corresponding to a button operation of the camera 201, and a priority assigning section 205 for assigning a priority to each of frames in the moving image based on the button input signal from the camera 201.

The video signal and a vertical/horizontal scan synchronous signal may be received from an imaging device. The button input signal is, for example, a signal corresponding to a recording start operation or a zooming operation. Hereinafter, it is assumed that the button input signal has a value of 1 when the button is pressed so as to be in the ON-state, while the button input signal has a value of 0 when the button is not pressed so as to be in the OFF-state. A method for assigning a priority to each frames will be described later.

A database 202 includes two recording mediums. One is a moving image recording medium 203 for recording the video signal and the synchronous signal output from the camera 201. The other is a priority recording medium 204 for recording the priority output from the priority assigning section 205. The database 202 has the function of recording data into the recording mediums as well as the function of reading the recorded data from the recording mediums.

FIG. 10 schematically shows the relationship between the image data and the priority corresponding to the image data. In FIG. 10, the frame number (F) represents an identifier for identifying each frame included in the moving image. For example, the frame number (F) is a serial number of the frames. The image data corresponding to each frame is recorded on the moving image recording medium 203. The priority corresponding to each frame is recorded on the priority recording medium 204.

FIG. 9B shows a part of the configuration of the system for generating a digest of a moving image. This part displays a digest of the moving image based on the priority corresponding to each frame. The database 202, the moving image recording medium 203, and the priority recording medium 204 are the same as those of FIG. 9A.

When a START/STOP input section 210 receives an instruction for a start of displaying a digest of the moving image, the frame number of the priority to be processed in the priority recording medium 204 is made to meet the frame number of the video signal to be processed initially in the moving image recording medium 203. The image selecting section 211 specifies at least one frame of the frames in the moving image based on the priority, and selects at least one image corresponding to the specified frame of all images included in the moving image. The output section 215 displays the selected images as a digest of the moving image. The output section may be a display or a printer.

Hereinafter, the processing at the image selecting section 211 will be described in detail.

The priority corresponding to each frame is input to the image selecting section 211. A judgment/synchronous section 214 compares the input priority with a threshold value. The threshold value is stored in a threshold value memory section 213. When a priority corresponding to a current frame is higher than the threshold value, the judgment/synchronous section 214 selects an image corresponding to the current frame of all images in the moving image. The selected image is conveyed to the output section 215. If the threshold value is set to a higher value, the number of the selected images is decreased, whereas if the threshold value is set to a lower value, the number of the selected images is increased. Thus, the level of the threshold value can be used as a measure for reducing the amount of information. Only the images corresponding to the priority higher than the threshold value are displayed as a digest of the moving image. Then, the judgment/synchronous section 214 transmits a response signal to the database 202 so as to ask the database 202 to output a video signal and a priority corresponding to the next frame. The operation mentioned above is one cycle of the operation with respect to the current frame of image. By repeating such a cycle for each of the frames until the START/STOP input section 210 receives an instruction to stop displaying the digest, the selected images are displayed as a digest of the moving image. Further, the output section 215 may be a recording device for recording a digest of the moving image instead of displaying the digest or printing the digest.

In order to change the threshold value, a threshold value changing section 212 may be provided in the image selecting section 211. The threshold value changing section 212 receives a new threshold value and changes the threshold value stored in the threshold value memory section 213 into the new threshold value.

Thus, according to the system of this example of the present invention, it is possible to automatically display a digest of the moving image by determining the priority of the respective images based on the button input signal during the recording operation.

In the present example, only the images that each have a higher priority are selected and displayed in the sequence order. Alternatively, when a screen is divided into a plurality of blocks, the images each having a higher priority may be displayed on respective blocks simultaneously, and when those blocks are different to each other in size, the images each having a higher priority may be displayed so that the images each having a higher priority are allocated to larger blocks, and the like.

In the present example, the priority is calculated during recording a video signal. However, the same effects can be obtained when the button input signal is recorded during recording a video signal, and then the priority is calculated on the basis of the recorded button input signal during the reproduction of a digest of the moving image. Such an example will be described below with referring to FIGS. 11A and 11B.

FIG. 11A shows a part of another configuration of the system for generating a digest of a moving image. This part records a button input signal on a recording medium during the recording of the moving image. A camera 201 and a moving image recording medium 203 are as the same components as those shown in FIG. 9A.

The system includes a camera 201 for outputting a video signal, a synchronous signal, and a button input signal. The video signal and the synchronous signal may be received from an imaging element. A database 202 includes two recording mediums, a moving image recording medium 203 for recording the video signal and the synchronous signal from the camera 201, and a button input signal recording medium 206 for recording the button input signal and the synchronous signal.

FIG. 11B shows a part of another configuration of the system for generating a digest of a moving image. This part determines the priority for each of the frames based on a button input signal recorded in the button input signal recording medium 206, and then displays a digest of the moving image based on the priority. A START/STOP input section 210, a moving image recording medium 203, an image selecting section 211, and an output section 215 are the same components as those of FIG. 9B. A priority assigning section 205 is the same component as that of FIG. 9A.

The operation of the system in displaying a digest of the moving image will be described below. When the START/STOP input section 210 receives a signal for the start of displaying a digest, the frame number of the button input signal to be processed in the button input signal recording medium 206 is made to meet the frame number of the video signal to be processed initially in the moving image recording medium 203. The priority assigning section 205 assigns a priority to each of frames based on the button input signal which is recorded on the button input signal recording medium 206. Then the image selecting section 211 specifies at least one frame of all of the frames in the moving image based on the priority, and selects images corresponding to the specified frames as a digest of the moving image, in the same manner as mentioned above. The selected images as a digest of the moving image are displayed by the output section 215 such as a display.

Thus, according to the system of this example of the present invention, a digest of the moving image can be displayed by recording the button input signal during recording a video signal and by determining the priority during reproducing the digest.

Hereinafter, in order to clarify how to assign a priority to each of the frames in the priority assigning section 205 shown in FIGS. 8, 9A and 11B, the principle of assigning a priority to each of the frames based on a button input signal will be described below.

The video camera is provided with various buttons such as a recording button, zooming button, fade button, focus button, exposure button, white balance button, shutter speed button, etc. It is possible to assume the user's intent in recording a moving image by detecting which button is pressed. The user's intent is, for example, directed to an image which the user considers very important in recording the image and a cut-change image at which a cut is changed into another cut. If it is detected that the START/STOP button or the fade button has been pressed, it is clear that a cut is changed. If it is detected that the zooming button is in the ON-state, it is assumed that the user is adjusting an angle of view. If an object is imaged in a close-up after the angle of view is set, there is a strong likelihood that the user considers the image of the object very important.

In order to make a digest for quickly and briefly seeing the contents of a moving image, there is a method in which only important images are displayed and another method in which more important images are displayed for a longer time. In order to make a digest including all cuts of the moving image, for example, there is a method in which images are extracted from each of the cuts for a prescribed period of time and the extracted images are displayed. Any one of these methods can be realized by adjusting the priority assigned to each of the frames in the moving image. In the case where only images having a priority of not less than a prescribed value are displayed as is done in the image selecting section 211 of FIG. 9B, if a more important image is assigned to a higher priority, it becomes easy to display the important image, whereas it becomes very difficult to display a non-important image.

As is described above, if the state of image such as an important image and a cut-change image is assumed based on the button operations by the user, and a method of displaying a digest is determined, a digest by which the contents of the moving image is quickly and briefly seen will be obtained.

Table 1 shows the relationship between button operations and the state of images, and the relationship between the state of images and the priorities. With reference to Table 1, a method for assigning priority to each of frames based on the button operations will be described. In Table 1, the buttons are classified into two groups: a recording button group including the recording button by which the cut-change can be detected, and a zooming button group including the zooming button by which the important images can be detected.

The two groups each have a different number of button input signals. Specifically, a button in the recording button group generates two patterns of button input signals. This is because the button in the recording button group is a single input button and is in either the ON-state or the OFF-state. Herein, when the input button is in the ON-state, the state of an image is in a state of the adjustment of the image. Just after the input button is changed from the ON-state to the OFF-state, the state of the image is in a state of the cut-change. A button in the zooming button group generates more patterns of button input signals. This is because the button in the zooming button group has two input buttons and each input button is in either the ON-state or the OFF-state with the combinations. One input button of the zooming button group is called a set button such as a zooming-in button and a serial shooting setting button. The other input button of the zooming button group is called a release button such as a zooming-out button and a serial shooting releasing button. However, generally, both of the set buttons and the release buttons would not be in the ON-state, therefore, there are three kinds of input patterns as follows:

ON-state of the set button,

ON-state of the release button, and

OFF-state

Herein, when the set button is in the ON-state, the state of the image is in a state of the adjustment of the image. When the release button is in the ON-state, the state of the image is also in a state of the adjustment of the image. During a period from the end of the ON-state of the set button to the start of the ON-state of the release button, the state of the image is in a state of an important image.

As mentioned above, the state of the image is assumed from the button input signal. The state of the image includes a state of the cut-change, state of the adjustment of the image and a state of the important image.

It will be described below how a priority is determined in accordance with the state of the image.

TABLE 1

| Classification | Recording button group | Zooming button group |
|---|---|---|
| Button kind | Recording, Fading Focus, Exposure, White balance | Zooming. Shutter speed Serial shooting. Still |
| Relationship between button input signal and the state of the image | 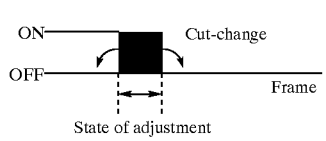 | 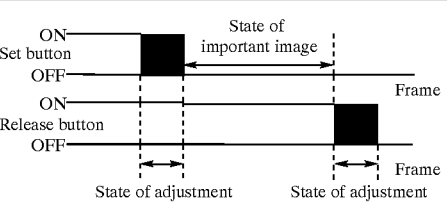 |
| Priority | 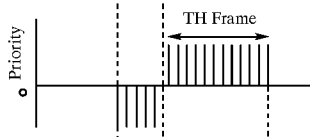 | 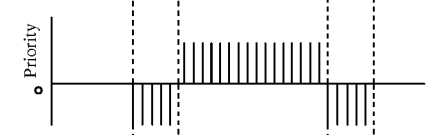 |
| Mode | 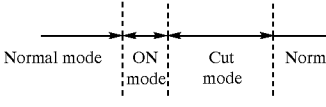 | 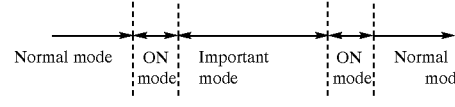 |

The priority of an image which is recorded during the adjustment of the angle of view is made lower so as to be omitted from displaying a digest. On the other hand, the priority of an important image is made higher so as to be selected as a digest of the moving image. In order to make a digest including all cuts, a prescribed number (TH) of images after the cut-change are supplied with higher priority so that at least the first images of the respective cuts are displayed. The priority of images other than the cut-change image, the image during the adjustment of the angle of view, and the important image are made at 0.

Hereinafter, a period of the image during which a priority is assigned to frames by the use of the same rule is referred to as "a mode". It will be described how the priority is assigned to frames as follows:

The recording button group (three modes of A, B and C below):

A: ON mode (the button is in the ON-state: the state of the adjustment an image; priority P<0)

B: cut mode (a period of time of TH frames starting from a cut-change image; priority P>0)

C: normal mode (others; priority P=0)

The zooming button group (four modes of A, B, C and D below):

A: set-ON mode (the set button is in the ON-state: the state of the adjustment of an image; priority P<0)

B: release-ON mode (the release button is in the ON-state: the state of the adjustment of an image; priority P<0)

C: important mode (the state of important image such as close-up shots; priority P>0)

D: normal mode (others; priority P=0)

Figure 12B:
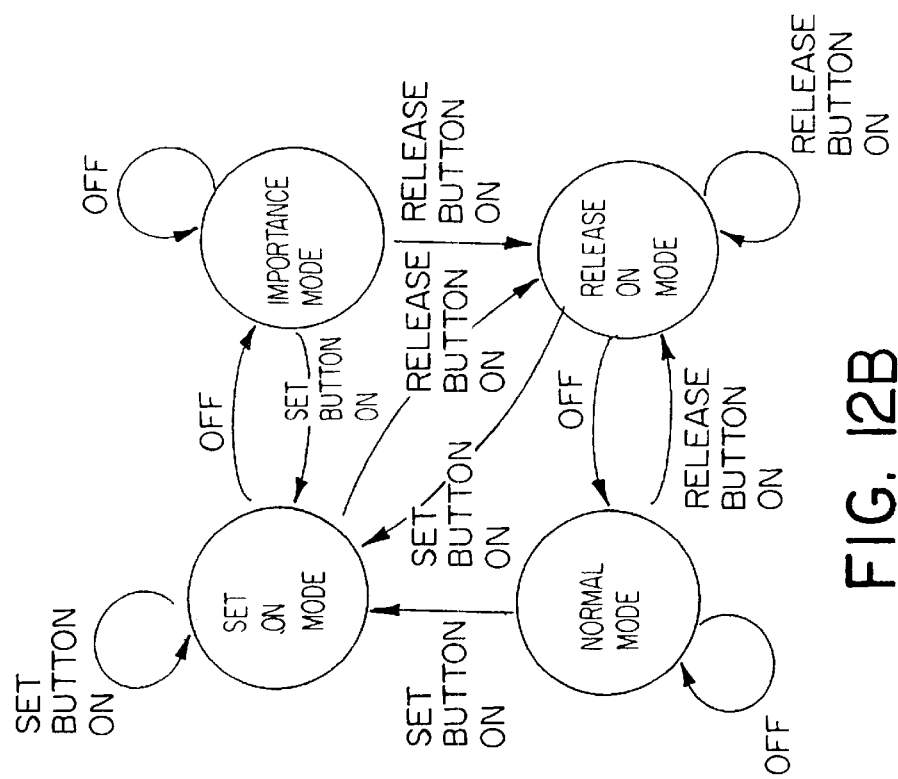
FIG. 12B is a mode transition view with respect to a zooming button group.
Figure 12A:
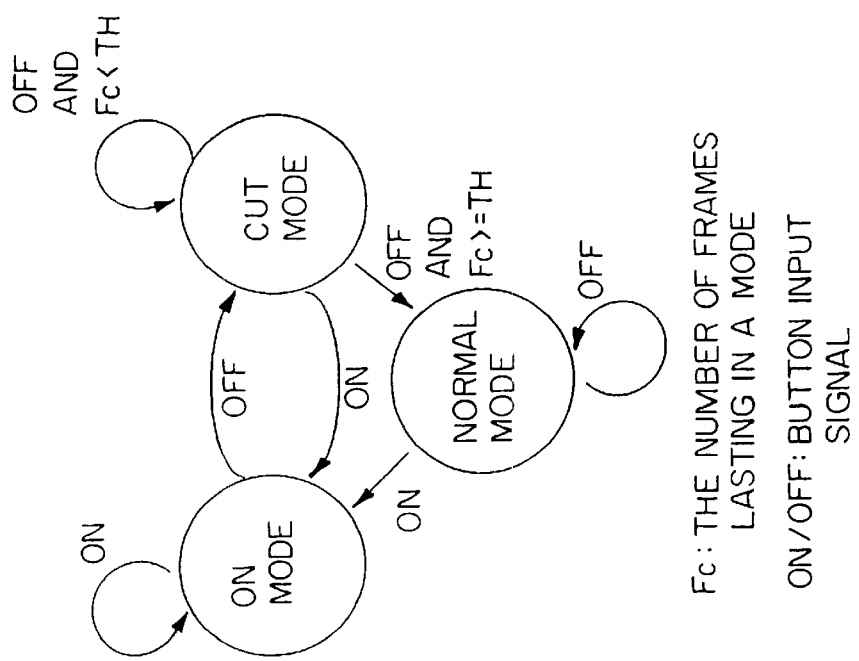
FIG. 12A is a mode transition view with respect to a recording button group.

Hereinafter, the method for assigning a priority to frames will be described more concretely with reference to Table 1, FIGS. 12A and 12B. FIG. 12A shows a mode transition of images with respect to the recording button group. FIG. 12B shows a mode transition of images with respect to the zooming button group.

As is seen from FIGS. 12A and 12B, the mode of the currently processed image can be determined from the followings items:

(1) a mode of the previous frame, (2) an ON or OFF state of the button, and (3) the number of frames by which the same cut mode lasts (only in a case of the recording button group).

As is described above, the current mode of the image is determined in accordance with the procedure of the mode transition of the image shown in FIGS. 12A and 12B, and the priority of the image is set so as to correspond to the mode. Thus, the priority of respective images can be determined from the button input signal.

FIG. 13 shows a configuration of the priority assigning section 205 for assigning a priority to each of the frames in the moving image based on the button input signal in the recording button group according to the above-mentioned principle. The priority assigning section 205 includes a state detecting section 220 for determining the mode of a current frame, and a priority determination section 224 for generating a priority as a function of the mode determined by the state detecting section 220. The state detecting section 220 includes a mode accumulating section 221, a mode judging section 222, and a counter 223.

First, the operation of the state detecting section 220 will be described.

The mode accumulating section 221 stores a mode of an image corresponding to the previous frame. A counter 223 stores the number (Fc) of frames by which the same mode lasts. The mode of the image corresponding to the previous frame and the number Fc are supplied to the mode judging section 222. Initially, the mode accumulating section 221 is set to a normal mode, and the counter 223 is set to 0.

The mode judging section 222 receives an button input signal from the camera 201, and determines the mode of the image corresponding to the current frame based on the button input signal, the state of the image corresponding to the previous frame and the number Fc in accordance with the state transition shown in FIG. 12A. After determining the mode of the image corresponding to the current frame, the mode stored in the mode accumulating section 221 is updated. Furthermore, the mode judging section 222 resets the number Fc to 0 when the mode is changed, and increments the number Fc one by one for every frame as long as the same mode lasts.

The priority determination section 224 determines the priority corresponding the current frame as a function of the mode of the image corresponding to the current frame determined by the mode judging section 222. Specifically, the priority P is determined using a function K as follows:

$$P=K(M)$$

wherein, M denotes the current mode, and K denotes, for example, a function with which P is converted to be −1 if the ON mode, 0 if the normal mode, and 1 if the cut mode.

In order to assign a priority to each of the frames based on an button input signal in the zooming button group, the configuration of the priority assigning section 205 shown in FIG. 13 may be modified to the following manners:

(1) the procedure shown in FIG. 12A in the mode judging section 222 may be modified into a procedure shown in FIG. 12B, and (2) the counter 223 shown in FIG. 13 may be omitted. This is because the number of the frames by which the same cut mode lasts is not used in judging the current mode.

As is described above, according to the present example, by assuming the state of the image on the basis of the button input signal, and a priority which meet the user's intent can be set to each of the frames, so that a digest can be generated to meet the user's intent.

In the present example, the priority to respective modes is constantly maintained, but it is also possible to vary the value of the priority as time elapses as is shown in FIG. 14. Moreover, it is also possible to continuously adjust the display time of the digest by the threshold value changing section 212 of FIG. 9B. In this case, the priority determination section 224 determines the priority using the following equation:

$$P=K(M) \cdot L(Fc, M)$$

The relationships between L(Fc, M) and Fc are shown in FIG. 15.

Hereinafter, another configuration of the priority assigning section 205 will be described. The priority assigning section 205 having the configuration shown in FIG. 13 assigns a priority to each of the frames on the basis of a single button input signal. Now, the priority assigning section 205 for assigning a priority to each of the frames on the basis of any combination of a plurality of button input signals.

Figures 16A, 16B:
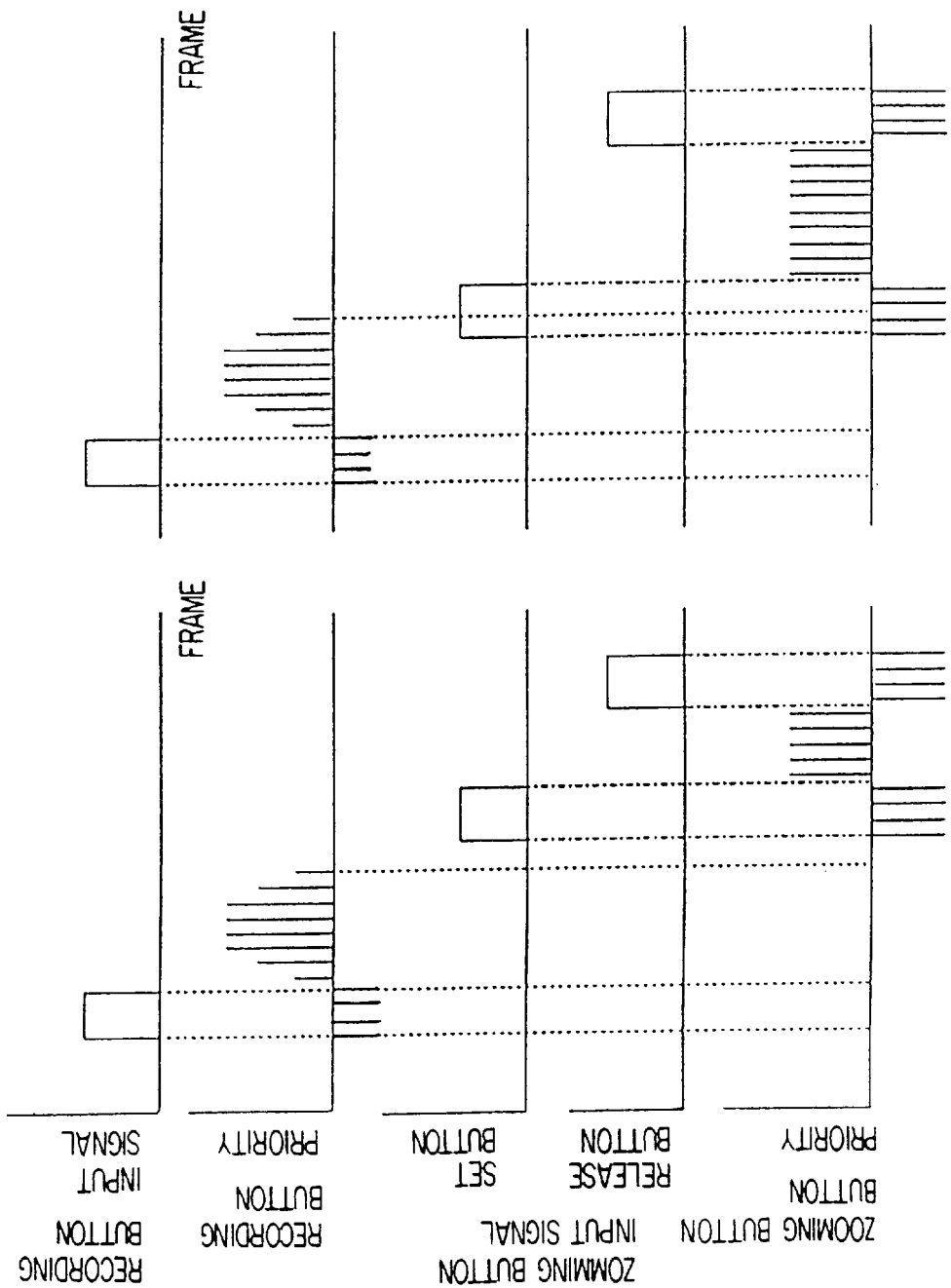
FIGS. 16A and 16B show a case where a priority of a START/STOP button and that of a zooming button are not overlapped with each other and a case where they are overlapped with each other.

It is assumed that a priority P is independently determined on the basis of respective button input signals. FIG. 16 shows time charts where the horizontal axis shows a number of frames, and the vertical axis shows respective button input signals of the recording button and the zooming button, and respective priorities thereof which are determined according to the previous example on the basis of the respective button input signals thereof. FIG. 16A shows a case where the priority of the recording button and that of the zooming button are not overlapped with each other. In this case, only the priority of one button is not 0, and the priorities of the others are 0. Therefore, the priority not equal to 0 can be regarded as a final value. However, generally, as is shown in FIG. 16B, the priority of the recording button and that of the zooming button are overlapped with each other at one or more portions.

According to the present example, a mode (hereinafter, referred to as a button operation mode in distinction from the mode referred in the previous example) is independently judged on the basis of the respective buttons, and finally all the priorities of respective modes are integrated.

Figure 17:
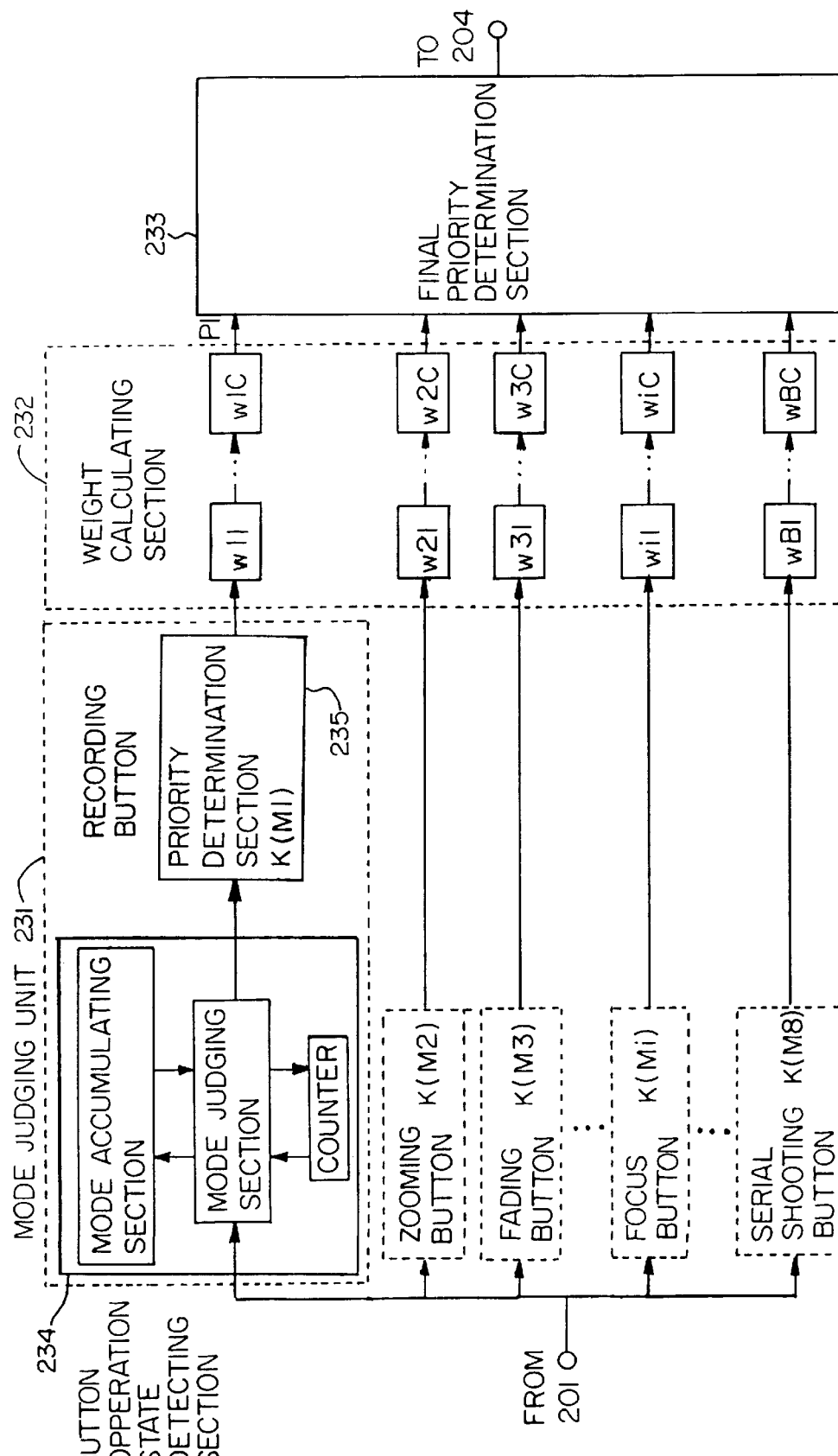
FIG. 17 is a block diagram showing a structure for a priority assigning section.

FIG. 17 shows another configuration of the priority assigning section 205. The priority assigning section 205 includes a plurality of mode judging unit 231 and a weight calculating section 232 and a final priority determination section 233. Each one of the plurality of mode judging units 231 is the same as the unit shown in FIG. 13 in structure, and corresponds to each of the plurality of button input signals.

The button input signal from the camera 201 is input to the mode judging unit 231 provided per button. When a particular button is in the ON-state, the button input signal corresponding to the particular button is supplied to each of the plurality of mode judging unit 231 so that the button signal has a value of "1" for only one mode judging unit 231 corresponding to the particular button and the button signal has a value of "0" for the other mode judging units 231. The operation of the mode judging unit 231 is much the same as that of FIG. 13. Specifically, the button operation state detecting section 234 detects a button operation mode M according to the mode transition of FIGS. 12A and 12B. The priority determination section 235 converts the button operation mode M to one of the values $\{-1, 0, \}$ using the function K.

Thus, the output of mode judging unit 231 is obtained per button. Then, it is determined which priority of button is employed as the final priority on the basis of various factors as is described below.

As a first exemplary factor, If the cut mode of the recording button and the set ON mode of the zooming button are overlapped as is shown in FIG. 16B, the zooming button which was input later is considered to reflect the user's intent better.

As a second exemplary factor, the zooming button and the serial shooting button are both considered to be used for important images. However, the image corresponding to the serial shooting button is considered to be more important than the image corresponding to the zooming button. This is because the serial button is generally less used. Furthermore, the recording button and the exposure button are both considered to be used for changing the cut, but there is a case where the cut remains unchanged even the exposure button is pressed, while the cut is always changed when the recording button is pressed. Thus, even if the same state of the image can be assumed from different button operations, the probability that such an assumption meets the user's intent varies depending on the kind of button pressed.

In the present example, in order to determine the final priority from a plurality of priorities determined by the mode judging unit 231 per button, a weight per button is introduced. The weight per button is represented by the following equations with regard to the above factors:

$w_{ij}$ (i: the serial number of a button, $1 \leq i \leq B$, B=total number of buttons, j: the serial number of a factor, $1 \leq j \leq C$, C=total number of factors)

If the above first exemplary factor is defined as "a mode updated more recently will have a heavier weight", the weight for a button i can exemplarily be represented as follows:

$$w_{i1}=e^{-a \cdot Fc(i)}$$

wherein, Fc(i) denotes the number of frames by which the button i is in the same mode, and a denotes a constant.

If the above second exemplary factor is defined as "a button having a stronger likelihood that the assumed result meets the user's intent will have a heavier weight", weights for the recording button (1), the exposure button (2), the serial shooting button (3), and the zooming button (4) can previously be set, for example, at w12=1, w22=0.6, w32=1, and w42=0.8, respectively. The number in the parentheses represents a serial number for the button.

In FIG. 17, the button operation mode for the button i is represented as $M_i$, and the output of the mode judging unit 231 is represented as $K(M_i)$. The weight calculating section 232 calculates the weight $W_i$ for the button i on the basis of the weight $w_{ij}$ of the button i with respect to the factor j as follows:

$$W_i = \prod_j w_{ij}$$

The weighted priority $P_i$ of the button i is given by the following equation:

$$P_i=K(M_i) \cdot W_i$$

The priority determination section 233 compares absolute values |Pi| of respective weighted priorities per button, and then selects a button $i_{max}$ having a maximum value $|Pi_{max}|$. Thus, the priority $P_{imax}$ of the button $i_{max}$ is employed as a final priority.

As is described above, the final priority is determined from the plurality of weighted priorities per button, and consequently, the user's intent can be assumed better from the various conditions. Accordingly, on the basis of the thus determined final priority, the digest images can be selected, and images regarded as important by the user can be displayed, so that the contents of the images can be roughly grasped.

EXAMPLE 6

An apparatus for generating a digest of a moving image according to an sixth example will be described. The apparatus includes a portion for generating a digest and a portion for displaying a digest. In the apparatus, "a process of generating a digest" is executed prior to executing a process of displaying the digest. In the process of generating a digest, a camera operation during the recording of a moving image is assumed and is recorded in a database. Then, a digest is displayed based on the recorded camera operation in a process of displaying a digest. The camera operation includes any operation for changing direction, a position and an angle of view of the camera, and any combination thereof, such as panning, zooming, or the like.

Figure 18:
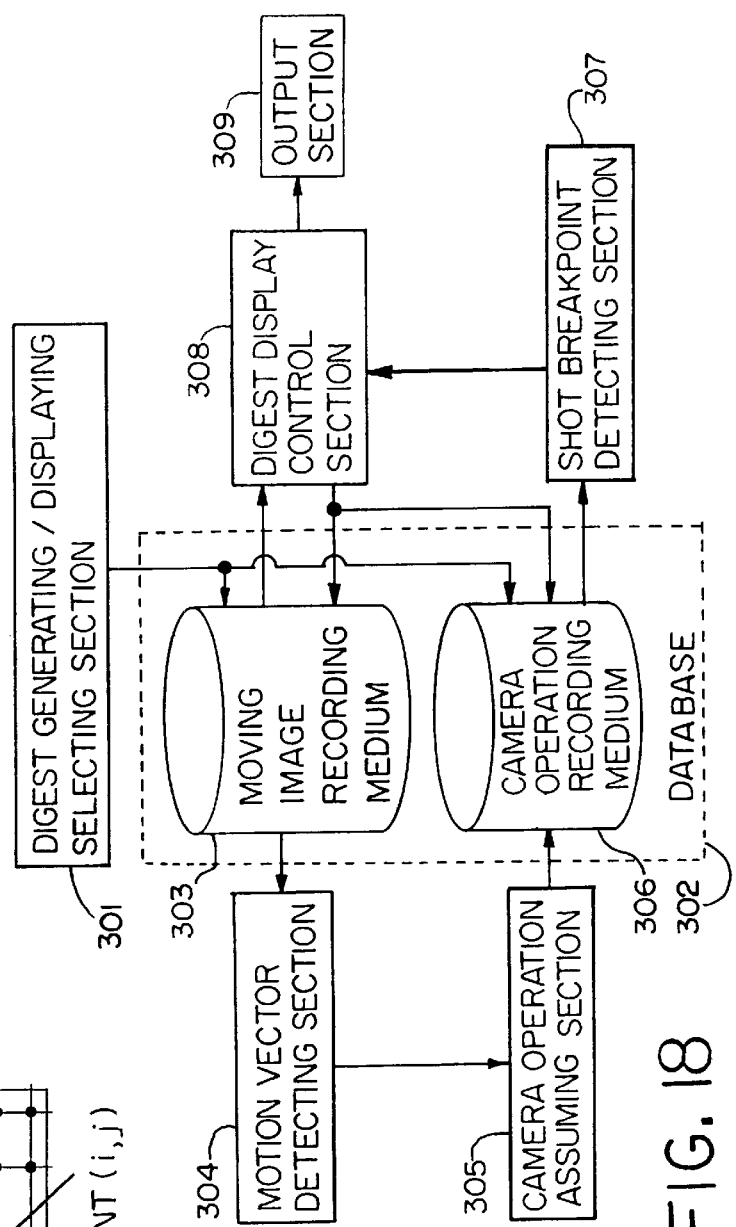
FIG. 18 is a block diagram showing a structure for an apparatus for generating a digest of a moving image according to an sixth example of the present invention.

FIG. 18 schematically shows a configuration of an apparatus for generating a digest of a moving image according to the present example. The apparatus includes a digest generating portion and a digest displaying portion. The digest generating portion is includes a motion vector detecting section 304 for detecting a motion vector between the frames in a moving image and a camera operation assuming section 305 for assuming a camera operation based on the motion vector. The digest displaying portion includes a shot breakpoint detecting section 307, a digest display control section 308 and a output section 309. In FIG. 18, a database 302 including a moving image recording medium 303 and a camera operation recording medium 306 is provided between the digest generating portion and the digest displaying portion. However, it is not necessary to provide such a database, if information is exchanged directly between the digest generating portion and the digest displaying portions.

To switch a mode of generating/displaying a digest, the apparatus may include a digest generating/displaying selecting section 301 for receiving an input from a user.

First, the process of generating a digest in the digest generating portion will be described.

When a mode of "generating a digest" is set in the digest generating/displaying selecting section 301, the moving image recording medium 303 is put into a state where the motion vector detecting section 304 can read data from the moving image recording medium 303, and the camera operation recording medium 306 is put into a state where the camera operation assuming section 305 can write data into the camera operation recording medium 306.

The motion vector detecting section 304 receives a video signal from the moving image recording medium 303, and then detects a motion vector between the frames for corresponding local portions of a screen. The detected motion vector is input to the camera operation assuming section 305. The camera operation assuming section 305 detects the operational amount of panning, zooming, or the like during the recording of a moving image so as to assume a camera operation. The detected operation amount is recorded into the camera operation recording medium 306.

Second, the process of displaying a digest in the digest display portion will be described.

When a mode of "displaying a digest" is set in the digest generating/displaying selecting section 301, the moving image recording medium 303 is put into a state where the digest display control section 308 can read data from the moving image recording medium 303, and the camera operation recording medium 306 is put into a state where the shot breakpoint detecting section 307 can read data from the camera operation recording medium 306.

The shot breakpoint detecting section 307 detects a frame corresponding to a breakpoint of the camera operation based on the operation amount recorded in the camera operation recording medium 306. For example, a start of the zooming operation and an end of the panning operation represents a breakpoint of the camera operation. Hereinafter, "a shot breakpoint" is referred to as a frame corresponding to a breakpoint of the camera operation.

Figure 35:
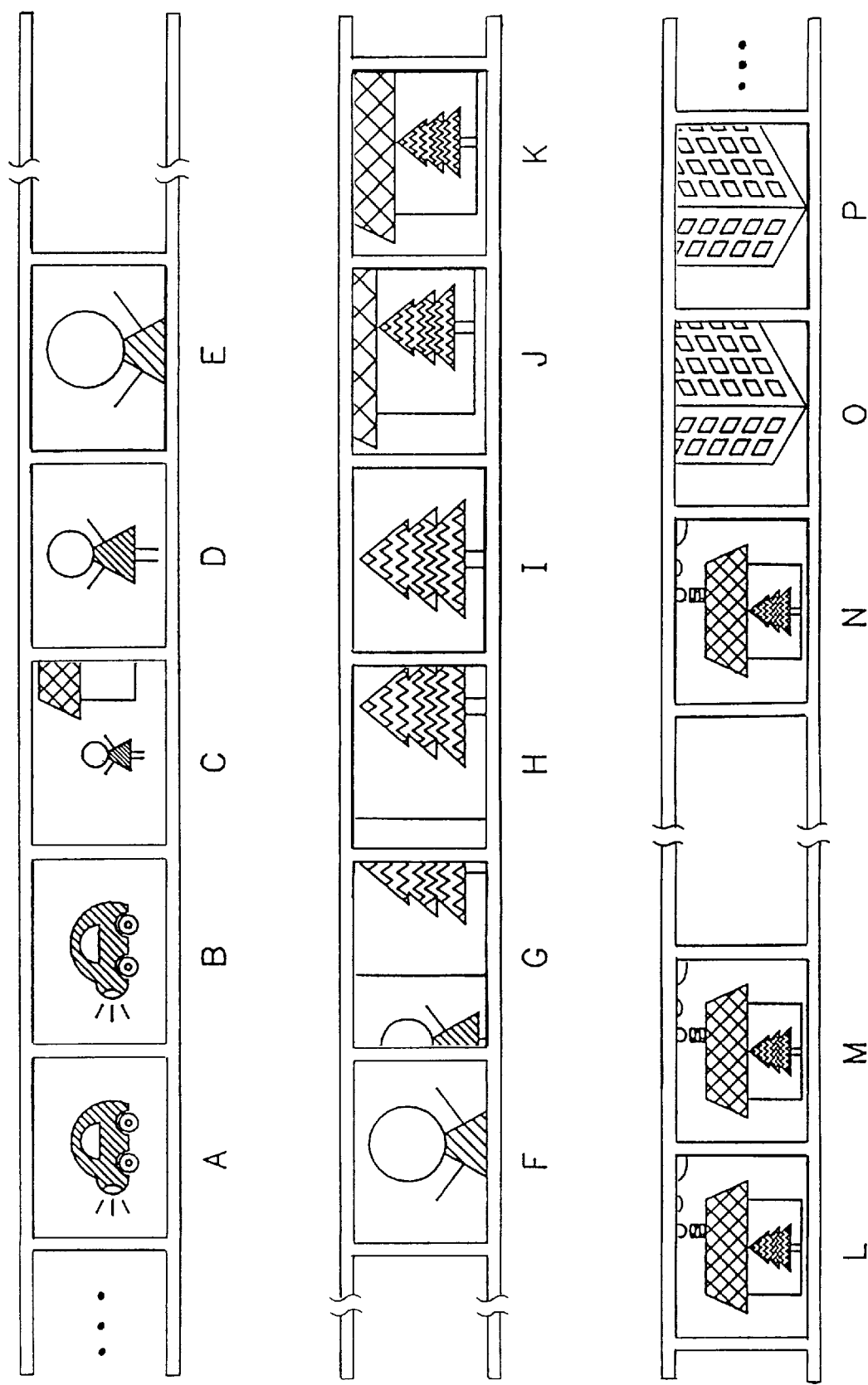
FIG. 35 shows a example of a moving image including a plurality of shots.

FIG. 35 shows an example of a moving image. The moving image includes a plurality of images corresponding frames A through P. In this example, it is assumed that a first cut consists of frames A to B relating to a car, a second cut consists of frames C to N relating to a girl and a house, and a third cut consists of frames O to P relating to a building. The second cut includes a plurality of shots. For example, a group of the frames C to F is referred to as a zoom-in shot, a group of the frames G to I is referred to as a panning shot, a group of the frames J to N is referred to as a zoom-out shot, respectively, in accordance with corresponding camera operations.

The digest display control section 308 selects at least one image included in the moving image based on the frame detected by the shot breakpoint detecting section 307, and determines how the selected images display as a digest. The selected images are conveyed to the output section 309, where the selected images are displayed as a digest.

Figure 19A:
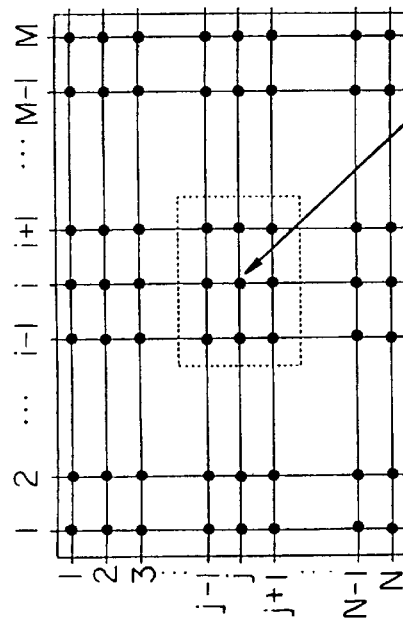
FIG. 19A is a view showing the position of a lattice point for detecting a motion vector in the motion vector detecting section according to the sixth example.
Figure 19B:
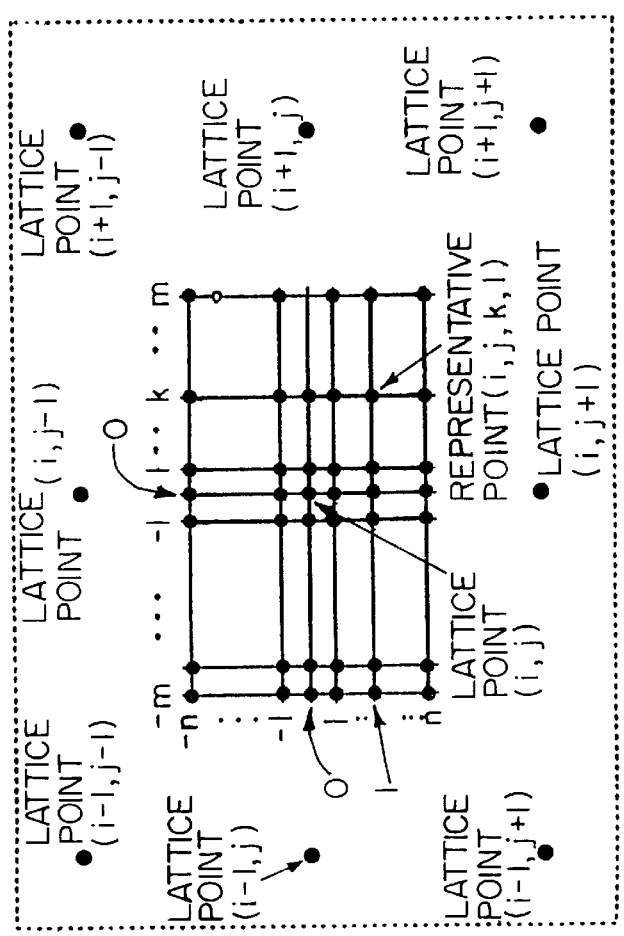
FIG. 19B is a view showing representative points with respect to the lattice point of FIG. 19A.

Hereinafter, the operation of the motion vector detecting section 304 will be described with reference to FIGS. 19A and 19B. In FIG. 9A, M lines and N lines are arranged in a horizontal direction and a vertical direction, respectively through the entire screen. The point of the intersection of the respective M lines and the respective N lines shows the position of a motion vector to be detected. Herein, the point of the intersection is referred to as a lattice point. The point of intersection of the ith line of the M lines and the jth line of the N lines is represented as a lattice point (i, j), wherein $1 \leq i \leq M$, $1 \leq j \leq N$.

In the present example, a motion vector at a lattice point is determined by selecting a plurality of representative points around the respective lattice points, and by representative point matching. FIG. 19B shows a zoomed-up portion including a lattice point (i, j) of FIG. 19A to clarify a relationship between the lattice point (i, j) and $(2 \cdot m+1) \cdot (2 \cdot n+1)$ representative points located around the lattice point. Herein, a representative point disposed on the kth line in the horizontal direction and the lth line in the vertical direction is referred to as a representative point (i, j, k, l), wherein $-m \leq k \leq m$, $-n \leq l \leq n$. As is seen from FIG. 19B, the representative point (i, j, 0, 0) is equal to the lattice point (i, j).

Figure 20:
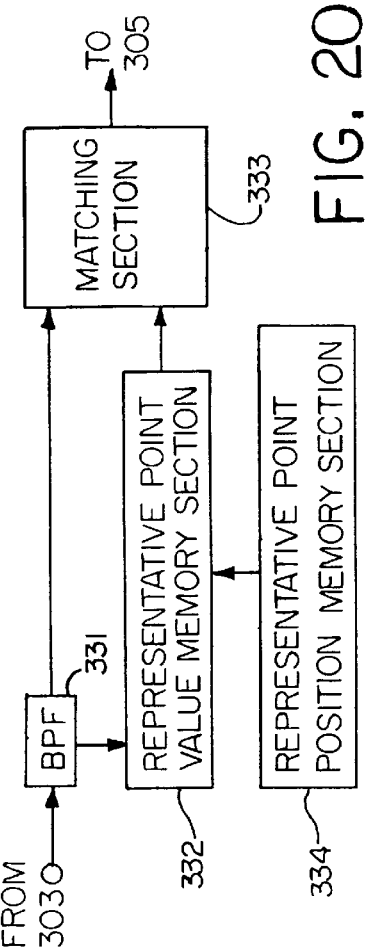
FIG. 20 is a block diagram showing a structure for a motion vector detecting section according to the sixth example.

FIG. 20 shows a configuration of the motion vector detecting section 304, which is helpful for clarifying how a motion vector is obtained. A video signal is input to the motion vector detecting section 304 from the moving image recording medium 303. It is assumed that the video signal will be input once for every r frames, where r is a prescribed number. Herein, an image at the time of t is referred to as an image of the 0th frame, and an image at a time of (t+τ) is referred to as an image of the (30·τ)th frame.

Now, it is assumed that an image of the Rth frame is input to the motion vector detecting section 304. The input image is first passed through a band pass filter included in a BPF 331. Herein, the value of an image at the point of coordinates (x, y) after the BPF processing is represented by I(x, y).

A representative point value memory section 332 stores the value of the representative point of an image r frames before, i.e. an image of the (R−r)th frame, after the BPF processing. Specifically, the following value at the representative point (i, j, k, l) is stored:

$$Y(i, j, k, l) = I(\text{pos } x(i, k), \text{pos } y(j, l))$$

where, $1 \leq i \leq M$, $1 \leq j \leq N$, $-m \leq k \leq m$, $-n \leq l \leq n$ pos x(i, k) represents an x coordinate of the representative point (i, j, k, l)

pos y(j, l) represents a y coordinate of the representative point (i, j, k, l).

A matching section 333 receives the image I(x, y) after the BPF processing from the BPF 331, and receives the representative point value Y(i, j, k, l) from the representative point value recording section 332, and thus determines a motion vector at respective lattice points by the use of the representative point matching technique. Specifically, a motion vector (g, h) is determined by searching g and h which make the following value minimum with respect to the lattice point (i, j), the g and h being within the range of $(2 \cdot G) \cdot (2 \cdot H)$, wherein, $-G \leq g \leq G$, $-H \leq h \leq H$:

$$\Sigma_h \Sigma_l \{Y(i, j, k, l) - I(\text{pos } x(i, 0) + g, \text{pos } y(j, 0) + h)\}$$

The contents of the representative point value memory section 332 is updated after the processing of the matching section 333 is completed. More specifically, the representative point value of the Rth image after the BPF processing is recorded by using the following coordinates of the representative point stored in the representative point position memory section 334:

pos x(i, j, k, l), pos y(i, j, k, l)) $1 \leq i \leq M$, $1 \leq j \leq N$, $-m \leq k \leq m$, $-n \leq l \leq n$.

As is described above, the motion vector can be determined from two images, an input image and an image r frames before the input image.

Next, the operation of the camera operation assuming section 305 will be described, which is helpful for clarifying how the camera operation is assumed from a motion vector.

Some camera operations can be assumed from the moving images. For example, a change of a direction of the camera in the horizontal or vertical direction, such as a panning operation or a tilting operation, a change of an angle of view of the camera, such as a zooming operation, a change of a position of the camera in the horizontal, vertical, fore or back direction, such as a tracking operation, a booming operation, or a dollying operation, can be assumed from the moving images. For convenience, a method for assuming three kinds of camera operations, the panning operation, tilting operation, and zooming operation will be described below.

First, it will be described how a point which is projected to an imaging plane of the camera is moved in accordance with the above three kinds of camera operations.

Figure 21:
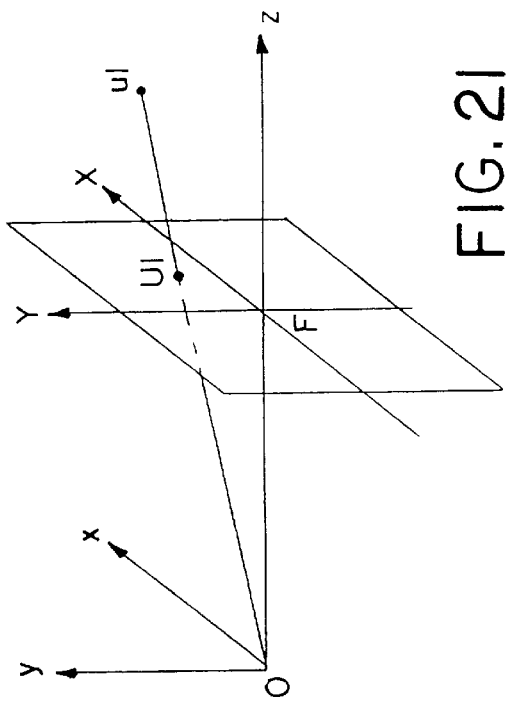
FIG. 21 shows the relationship between an imaging plans of a camera and an object.

FIG. 21 shows a positional relationship between the imaging plane of the camera and an object. The coordinates in a three-dimensional space of the camera are represented by (x, y, z), and the coordinates of the two-dimensional imaging plane are represented by (X, Y). It is assumed that the camera is disposed at the origin of the three dimensional coordinates, and the optical axis of the camera is z axis. It is also assumed that the imaging plane is located at a position where z=F (F: a focal length). An arbitrary point having the coordinates u1=(x1, y1, z1) is projected onto a point having the coordinates U1=(X1, Y1) on the imaging plane. The relationship between the coordinates of the object and the coordinates of the imaging plane is represented by the following equation (6):

$$X1 = F \cdot x1/z1$$

$$Y1 = F \cdot y1/z1 \quad (6)$$

With reference to coordinates of FIG. 21, it will be described how the coordinates of the object projected onto the imaging plane are moved in accordance with the zooming operation.

Figure 22A:
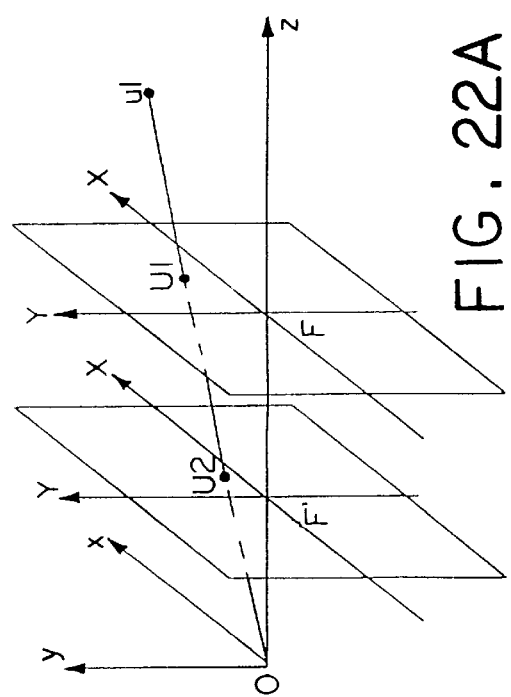
FIG. 22A is a view for illustrating the change of the relationship between the image plane of the camera and the object during a zooming operation.

FIG. 22A illustrates the change of the coordinates of the object projected onto the imaging plane in accordance with the zooming operation. As is shown in FIG. 22A, when the focal length is changed from F to F', the projection of the object at the coordinates of u1 is changed from U1=(X1, Y1) to U2=(X2, Y2). According to the equation (6), U2 satisfies the following conditions:

$$U2 = U1 \cdot F'/F = f \cdot U1$$

where, f=F'/F.

Figure 22B:
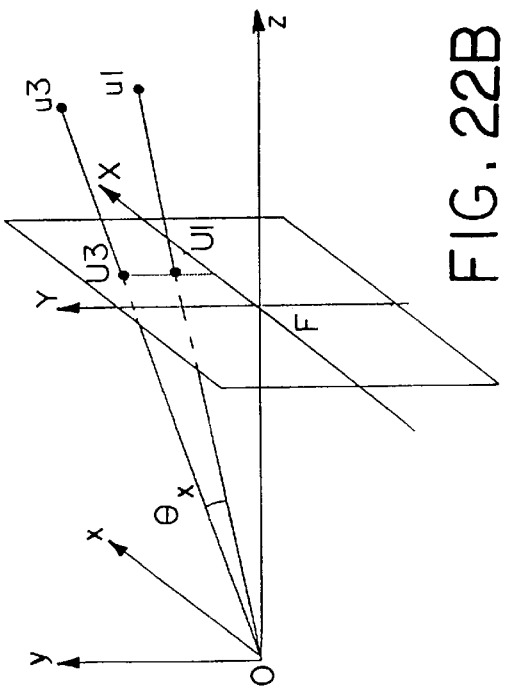
FIG. 22B is a view for illustrating the change of the relationship between the image plan of the camera and the object during a tilting operation.

Next, with reference to FIG. 22B, it will be described how the coordinates of the object projected onto the imaging plane is moved in accordance with the panning operation or the tilting operation. The panning operation is defined as an operation for rotating the camera with respect to the y axis, while the tilting operation is defined as an operation for rotating the camera with respect to the x axis. As is shown in FIG. 22B, in a case where the camera is rotated by θx with respect to the x axis, the coordinates u1 of the object in the space is moved to the coordinates u3. Herein, the coordinates u3 satisfies the following equation (7):

$$u3 = u1 \begin{bmatrix} 1 & 0 & 0 \\ 0 & \cos\theta x & -\sin\theta x \\ 0 & \sin\theta x & \cos\theta x \end{bmatrix} \quad (7)$$

When assuming that the rotation angle θx is sufficiently small, the coordinates U3=(X3, Y3) on the imaging plane after the movement are represented as follows from the above equation (6):

$$X3 = X1, \; Y3 = Y1 + F \cdot \theta x$$

When the camera is rotatable both on the x axis and the y axis, a relationship between the coordinates U1 before the operation and the coordinates U3 after the operation is more generalized so as to derive an equation as follows:

$$U3 = U1 + P$$

wherein, P=(px, py), and px and py are rotation components on the x axis and the y axis, respectively.

With respect to the general camera operation by a combination of the zooming, panning, and tilting operation, the coordinates U1=(X1, Y1) before the operation and the coordinates U'=(X', Y') after the operation satisfy the following equation:

$$U' = f \cdot U + P$$

Hereinafter, f is referred to as a zooming factor, and P is referred to as a rotation vector.

Accordingly, it is possible to assume the operation amount of the camera by determining the zooming factor and the rotation vector.

Hereinafter, it will be described how to determine the zooming factor and the rotation vector based on a motion vector detected by the motion vector detecting section 304. It is assumed that $U_{i,j}$ denotes coordinates of the lattice point (i, j) in the two-dimensional imaging plane, and $v_{i,j}$ denotes a motion vector detected by the motion vector detecting section 304.

If the camera operation caused the zooming factor f and the rotation vector P, the lattice point (i, j) would be moved to a position represented as follows:

$$U'_{i,j}(f, P) = f \cdot U_{i,j} + P$$

Accordingly, in order to assume the actual f and P based on the actual camera operation, it is required to calculate an error between the coordinates $U'_{i,j}(f, P)$ and the actual position $U^{real}_{i,j}$ and to determine f and P so that the error is made minimum. The error is represented by the following equation:

$$E(f, P) = \Sigma(U'_{i,j}(f, P) - U^{real}_{i,j})^2$$

where, the actual position is represented by $U^{real}_{i,j} = U_{i,j} + v_{i,j}$.

The error E is represented by a quadratic equation with respect to f and P. Accordingly, f and P are determined so that the error E is made minimum as follows:

$$f = \frac{\sum_{i,j} \langle U_{i,j}^{real}, U_{i,j} \rangle - \left\{ \sum_{i,j} U_{i,j}^{real}, \sum_{i,j} i, jU_{i,j} \right\} / M / N}{\sum_{i,j} \langle U_{i,j}, U_{i,j} \rangle - \left\{ \sum_{i,j} U_{i,j}, \sum_{i,j} U_{i,j} \right\} / M / N} \quad (8)$$

$$P = \left( \sum_{i,j} U_{i,j}^{real} - f \cdot \sum_{i,j} U_{i,j} \right) / M / N$$

Herein, $\langle \cdot, \cdot \rangle$ denotes an inner product.

The camera operation assuming section 305 receives the motion vector $v_{i,j}$ and the lattice point position $U_{i,j}$ from the motion vector detecting section 304, and calculates the zooming factor f and the rotation vector P in accordance with the equation (8), thereby finally assuming respective operation amount of the zooming, panning, and tilting operation. The determined zooming factor f and rotation vector P are recorded in the camera operation recoding medium 306.

Next, the operation of the shot breakpoint detecting section 307 will be described. When a mode of displaying a digest is set, the shot breakpoint detecting section 307 reads the zooming factor f and the rotation vector P from the camera operation recording medium 306, and then detects a shot breakpoint based on the zooming factor f and the rotation vector P. Herein, the shot is defined as a group of images corresponding to the same continuous camera operation, such as a close-up shot by zooming in on an object, a long shot for a far-off scene or the like. Accordingly, the shot breakpoint can be detected if a change point of the camera operation, such as a starting point of the zooming operation, and an end point of the panning operation is found. However, there are cases where the camera is moved slightly and the like due to a non-intentional camera operation. Therefore, herein, only drastic changes are detected. The change point of the camera operation is considered to be a point where the change amount of f and/or P exceeds a certain threshold value.

Figure 23A:
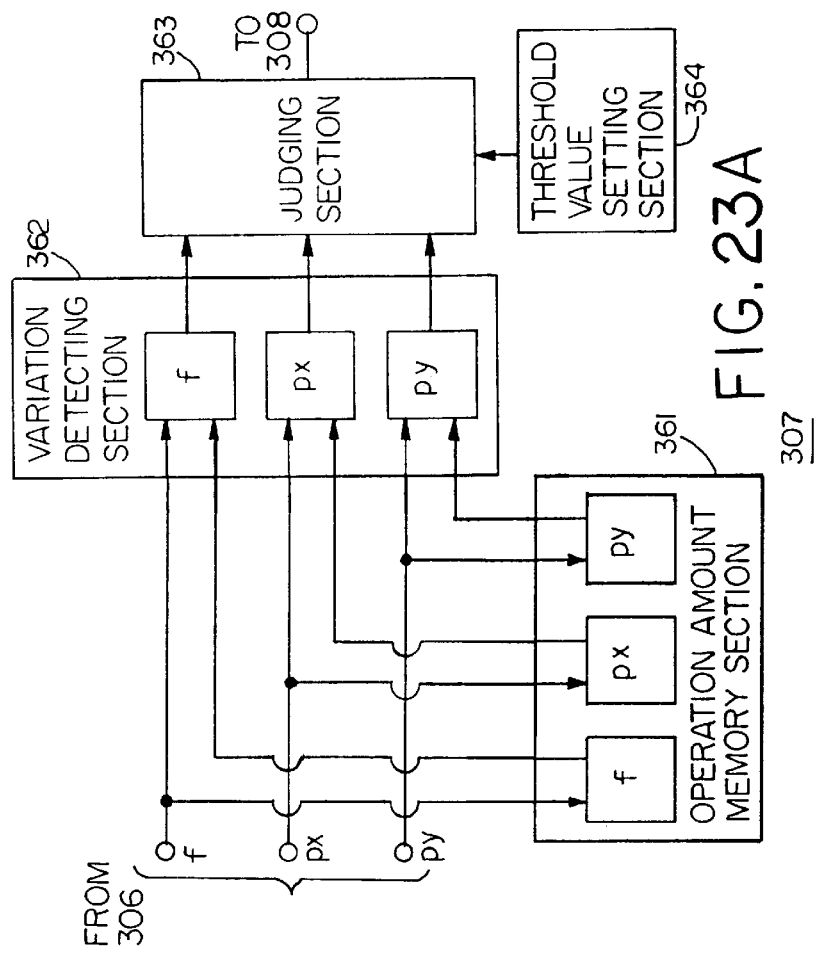
FIG. 23A is a block diagram showing a structure for a shot breakpoint detecting section according to the sixth example.

Hereinafter, it will be described how to detect a shot breakpoint based on the zooming factor f and the rotation vector P. FIG. 23A shows an exemplary configuration of the shot breakpoint detecting section 307.

Herein, it is assumed that camera operation amounts f(R), px(R), and py(R) with respect to the image of the Rth frame are stored in an operation amount memory section 361, and the camera operations are recorded at every r frames into the camera operation recording medium 306. In this case, the shot breakpoint detecting section 307 reads operation amounts f(R+r), px(R+r), and py(R+r) of the image of the (R+r)th frame from the camera operation recording medium 306.

A variation detecting section 362 determines absolute values of the differences |f(R)−f(R+r)|, |px(R)−px(R+r)|, and |py(R)−py(R+r)| between the operation amount of the currently input image and the operation amount of the image r frames before, with respect to the zooming factor f, x-component of the rotation vector px, and y-component of the rotation vector py, respectively. A judging section 363 compares three output values from the variation detecting section 362 with the respective threshold values. When at least one of the absolute values of the differences of the operation amounts is not less than the threshold value, the judging section 363 judges that a change of the camera operation occurs at the (R+r)th frame of image, and detects the (R+r)th frame as a shot breakpoint. After the operation amount of the Rth frame is used by the variation detecting section 362, the contents of the operation amount memory section 361 is updated so as to store f(R+r), px(R+r), and py(R+r) are stored. A threshold value setting section 364, where the threshold value to be used in the judging section 363 is set by the user's input operation, is used for changing the threshold value.

Figure 24A:
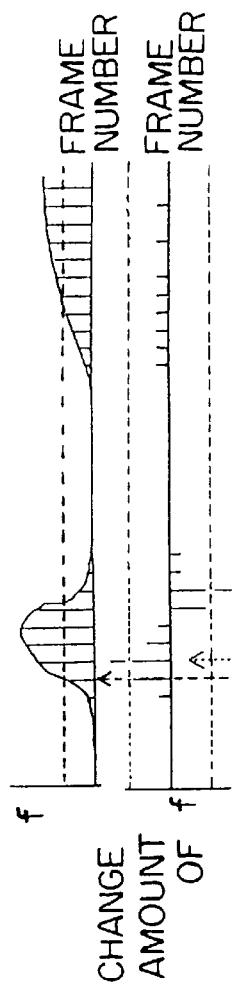
FIG. 24A is a view for illustrating the zooming factor f and a changes amount thereof.
Figure 24B:
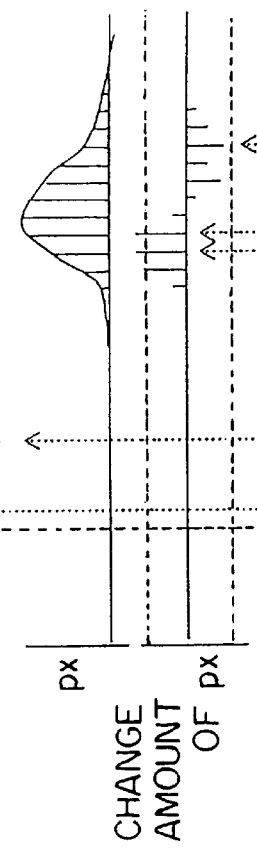
FIG. 24B is a view for illustrating the x component px of a rotation vector P and the change amount thereof.
Figure 24C:
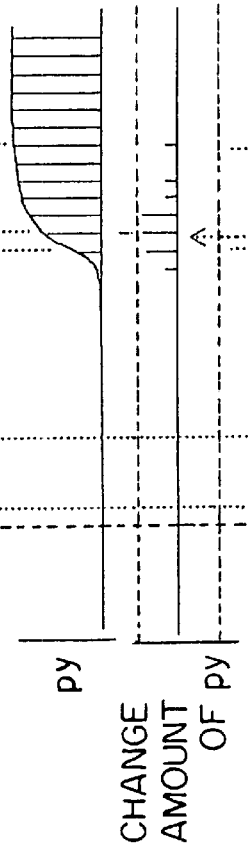
FIG. 24C is a view for illustrating the y component py of the rotation vector P and the change amount thereof.
Figure 24D:
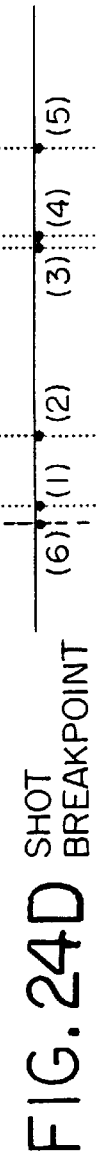
FIG. 24D is a view for illustrating points of shot breakpoints.

Thus, the shot breakpoint detecting section 307 is operated for an image of a frame. Next, an exemplary procedure for detecting the shot breakpoint will be described. FIGS. 24A through 24E show how the actual operation amount is changed as time elapses. FIGS. 24A through 24C show a relationship between the frame number and an operation amount and the frame number and a variation of the operation amount, with respect to the zooming factor f, x-component of the rotation vector px and the y-component of the rotation vector py, respectively. In FIGS. 24A through 24C, two horizontal broken lines shows threshold values. The frame numbers where the variation amount exceeds the threshold value are indicated with an arrow. Thus, is as is shown in FIG. 24D, five shot breakpoints (1) through (5) are detected.

As is described above, a shot breakpoint can be detected by comparing the respective variation of the operation amount with the respective threshold values.

Figure 23B:
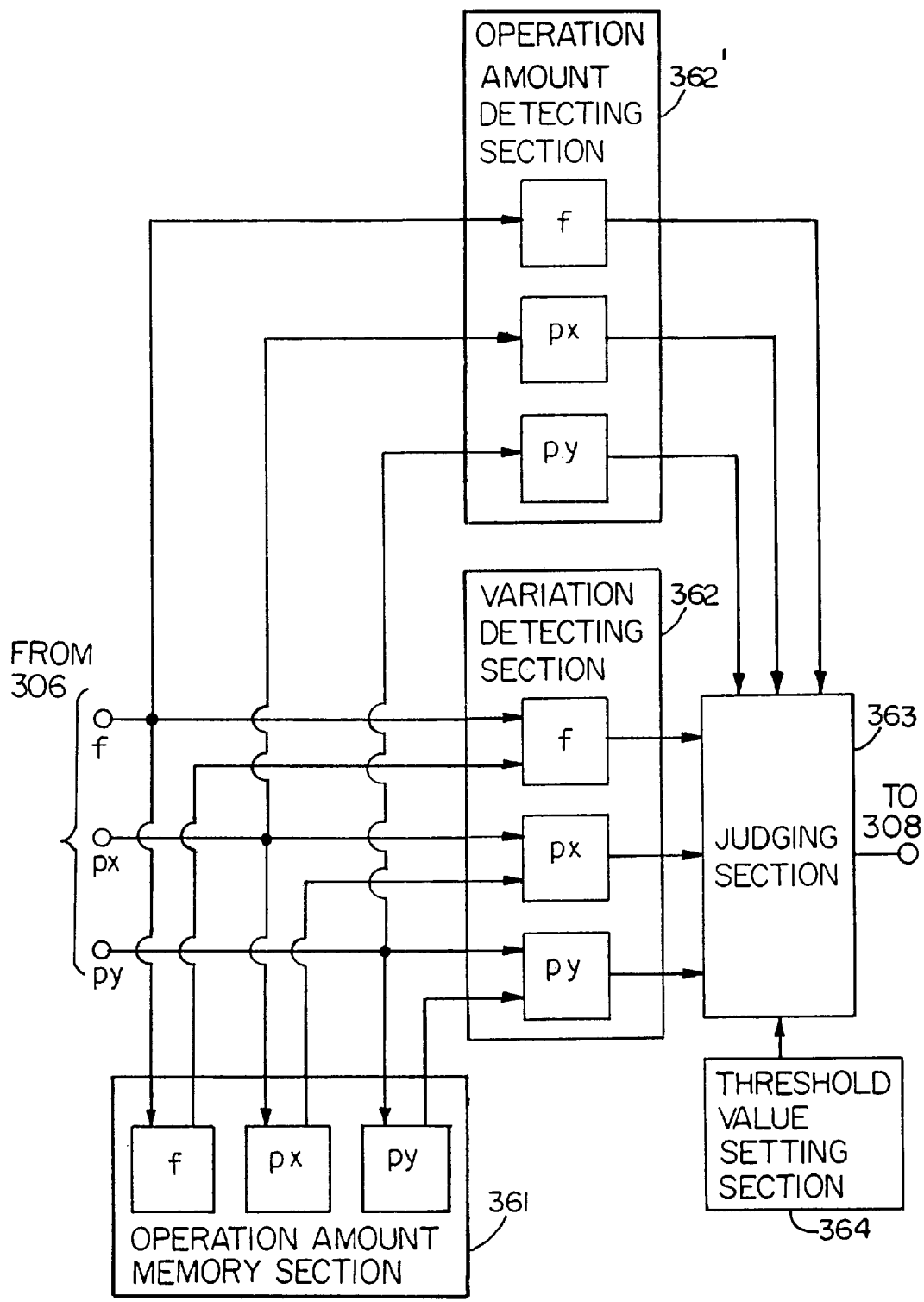
FIG. 23B is a block diagram showing a structure for another shot breakpoint detecting section according to the sixth example.

In addition, a shot breakpoint may be detected by comparing the respective operation amount with the respective threshold values. For example, if an operation amount of the zooming factor f increases and then exceeds a predetermined threshold value at a frame, then the position of the frame represents a shot breakpoint (See, (6) of FIG. 24D). In order to compare the respective operation amount with the respective threshold values, the shot breakpoint detecting section 307 may be modified so as to add an operation amount detecting section 362' as shown in FIG. 23B. In this case, when at least one of the absolute values of the differences of the operation amounts and the operation amounts is not less than the threshold value, the judging section 363 judges that a change of the camera operation occurs at the (R+r)th frame of image, and detects the (R+r)th frame as a shot breakpoint.

Hereinafter, the operation of the digest display control section 308 will be described. Herein, the digest display method is controlled on the basis of the shot breakpoints detected by the shot breakpoint detecting section 307. In the present example, the digest display is performed by selecting the images of a prescribed number of frames at every shot breakpoint.

Figures 25, 26, 27:
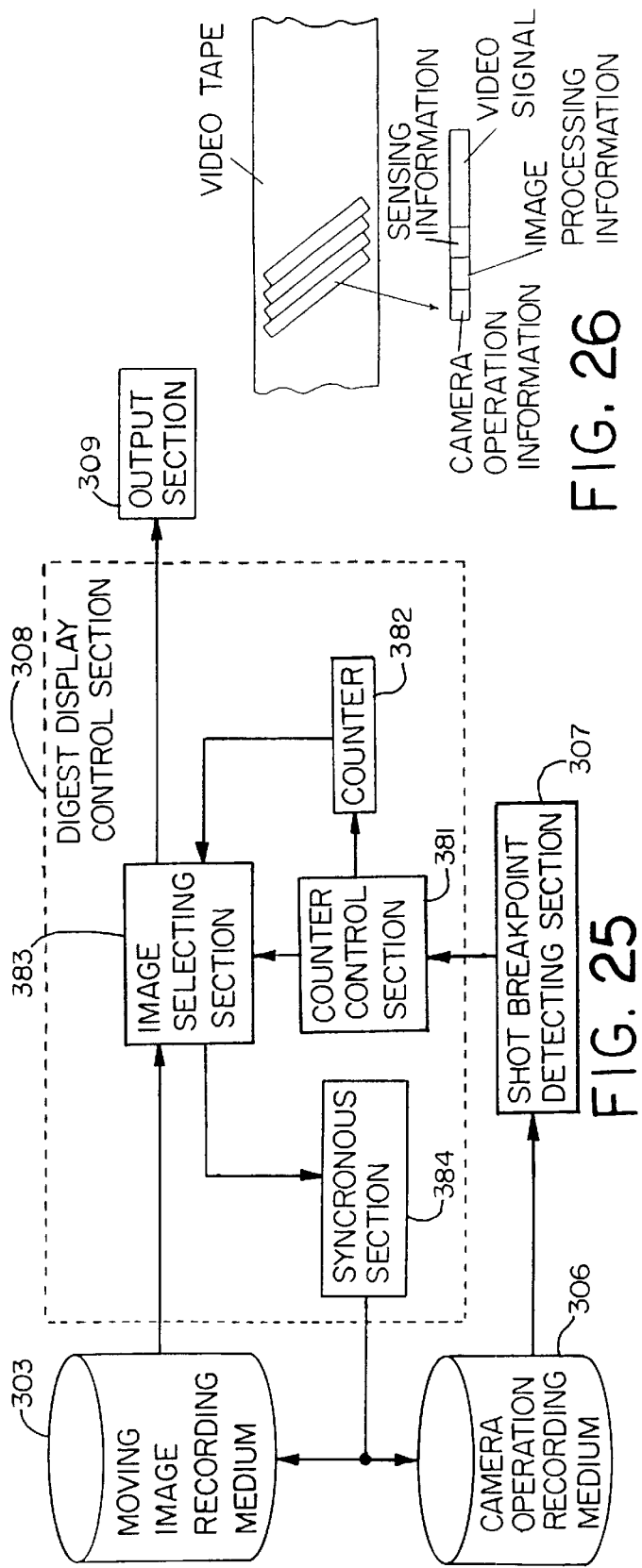
FIG. 25 is a block diagram showing a structure for a digest display control section according to the sixth example.
FIG. 26 shows a recording medium according to a seventh example of the present invention.
FIG. 27 shows a structure for an apparatus for generating a digest of a moving image according to an eighth example of the present invention.

FIG. 25 shows an exemplary configuration of the digest display control section 308. In FIG. 25, a counter 382 is a memory for storing a single natural number, wherein 0 is set as an initial value. It is assumed that a current camera operation processed by the shot breakpoint detecting section 307 corresponds to an image of the Rth frame.

The shot breakpoint detecting section 307 judges whether the current Rth frame is a frame corresponding to a shot breakpoint or not. The judgment result is input to the counter control section 381. When the counter control section 381 receives the judgment result indicating that the current Rth frame is a frame corresponding to a shot breakpoint from the shot breakpoint detecting section 307, the contents of the counter 382 is changed to a prescribed value of TH. On the other hand, when the counter control section 381 receives the judgment result indicating that the current Rth frame is not a frame corresponding to a shot breakpoint from the shot breakpoint detecting section 307, the contents of the counter 382 is decrements by one. However, if the contents of the counter 382 is 0, the contents remain unchanged.

After the processing of the counter control section 381, it is determined whether the image in displayed in the image selecting section 383. Specifically, when the contents of the counter 382 is larger than 0, the image of the Rth frame is selected as a display image, and then transmits the video signal to the output section 309. The output section 309 displays the transmitted image as a digest. Thereafter, a synchronous section 384 sends information that the processing for the image of the Rth frame is completed for the moving image recording medium 303 and the camera operation recording medium 306, and then initiates the processing for an image of the next frame.

Figure 24E:
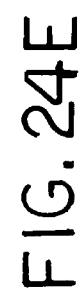
FIG. 24E is a view for illustrating the period of time for an image to be selected as a digest image.

When the above processing is performed in the example shown in FIGS. 24A through 24D, the result shown in FIG. 24E can be obtained, wherein an image of a frame having a value of 1 is displayed as a digest image.

As is described above, the camera operation during the recording of a moving image is assumed, and he images to be displayed are selected on the basis of he camera operations, and thus the digest display to meet the user's intent can be performed.

In the present example, the motion vector is detected according to the representative matching technique, but it can also be detected by other techniques such as a block matching technique and a characterized point matching technique.

In the present example, the zooming operation, the panning operation and the tilting operation are assumed, but any other camera operation such as a dreaming operation, or the like may also be assumed to obtain the same effects.

In the present example, the digest display method in which the images are respectively displayed for the prescribed time at every shot breakpoint is adopted, but it can employ any other methods to obtain the same effects, such as a method in which the screen is multi-divided, and a plurality of images corresponding to respective shot breakpoints are simultaneously displayed on the screen.

EXAMPLE 7

A recording medium for recording a moving image according to a seventh example will be described with reference to FIG. 26. FIG. 26 exemplarily shows the recording medium in the form of a video tape, but the moving image record medium of the present example may be in other form of a video disk or an IC memory or the like.

As is shown in FIG. 26, The video tape according to the present invention includes a portion for recording a video signal per frame unit and a portion for recording extracting information on the representative image corresponding to the video signal. Herein, the extracting information of the representative image includes camera operation information, image processing information, and sensing information. The video tape includes a portion for recording at least one of the camera operations information, the image processing information, and the sensing information.

The camera operation information means in formation obtained by detecting a camera operation made by the user during the recording a moving image, such as information on a recording start operation and a zooming operation. The information on the recording start operation means information indicating a point of the recording start by marking the point with a flag. The information on the zooming operation means information indicating the rate of the zooming. Both the information on the recording start operation and the information on the zooming operation can be detected on the basis of the button operations of the video camera.

The image processing information means information obtained by automatically or manually extracting and/or processing the video signal. The image processing information includes, for example, a frequency and the size of the high frequency component of a video signal determined to perform the focus control; a difference value between the frames in luminance signals and color signals; a position and a size of an object region extracted from the video signal; a backlight state and too excessive light state; $\gamma$ correction value; and a color temperature.

The sensing information means information obtained by detecting the state of the camera during the recording of the moving image by the use of any sensor. The sensing information include, for example, camera movement due to the panning operation detected by an angular speed sensor, or light intensity from an object detected by a light intensity sensor, an opening degree of the diaphragm of the lens detected by an aperture opening sensor, and a focus distance detected by a lens location detector.

According to the recording medium provided with such representative image extracting information, it is possible to extract the representative images among a plurality of images included in a moving image as is described later.

EXAMPLE 8

FIG. 27 shows a configuration of an apparatus for generating a digest of a moving image according to an eighth example of the present invention.

In the present example, a video signal and extracting information for extracting a representative image are recorded into a record medium. Then, the apparatus reads the extracting information from the record medium, and then evaluates the extracting information. On the basis of the evaluation, the apparatus extracts a representative image, as a static image, among images included in a cut. Herein, a cut means a group of successive static images from a frame at which the recording is started to a frame at which the recording is ended.

As is shown in FIG. 27, the apparatus includes an input section 401 for input a reproduced information, a camera operation information reading section 402, an image processing information reading section 403, a sensing information reading section 404, a video signal reading section 405, a representative image extracting section 406, a representative image managing section 407, a representative image memory section 408, and an output section 409. However, it is not necessary for the apparatus to include all of the camera operation information reading section 402, the image processing information reading section 403 and the sensing information reading section 404. The apparatus may include at least one of the camera operation information reading section 402 and the image processing information reading section 403.

Hereinafter, the operation of the above respective sections will be described in detail.

The information recorded in a recording medium is reproduced and input into the input section 401. The camera operation information reading section 402, the image processing information reading section 403, and an sensing information reading section 404 read out camera operation information, image processing information, and sensing information, respectively, from the reproduced signal input into the input section 401. In the present example, each coded information is decoded.

The representative image extracting section 406 detects a time period from a recording start to a recording end based on at least one of the camera operation information and the image processing information. For example, the recording start operation information included in the camera operation information is used to detect the point of the recording start. Next, on the basis of at least one of the camera operation information excluding the recording start operation information; the image processing information; and the sensing information: the representative image extracting section 406 evaluates whether an image included in each cut is suitable as a representative image for the cut. An image evaluated to be suitable for the representative image for the cut is input to the representative image managing suction 407 from the video signal reading section 405, and is stored in the representative image memory section 408. The representative image stored in the representative image memory section 408 is read out and displayed by the output section 409 such as a display and a printer. The operation of the representative image extracting section 406 will be described later in detail.

In the present example, the information for extracting the representative image as well as the video signal are previously recorded in the recording medium, and the extracting information for the representative image is read out and then the representative image is extracted from the recording medium. However, even if all or a part of the information for extracting the representative images is absent in the recording medium, the video signal recorded in the recording medium can be processed so as to acquire the information for extracting the representative image, and then the representative image can be extracted on the basis of the acquired information. Such a principle is later described in detail with respect to an apparatus for generating a digest of a moving image according to a ninth example.

EXAMPLE 9

Figures 28, 29:
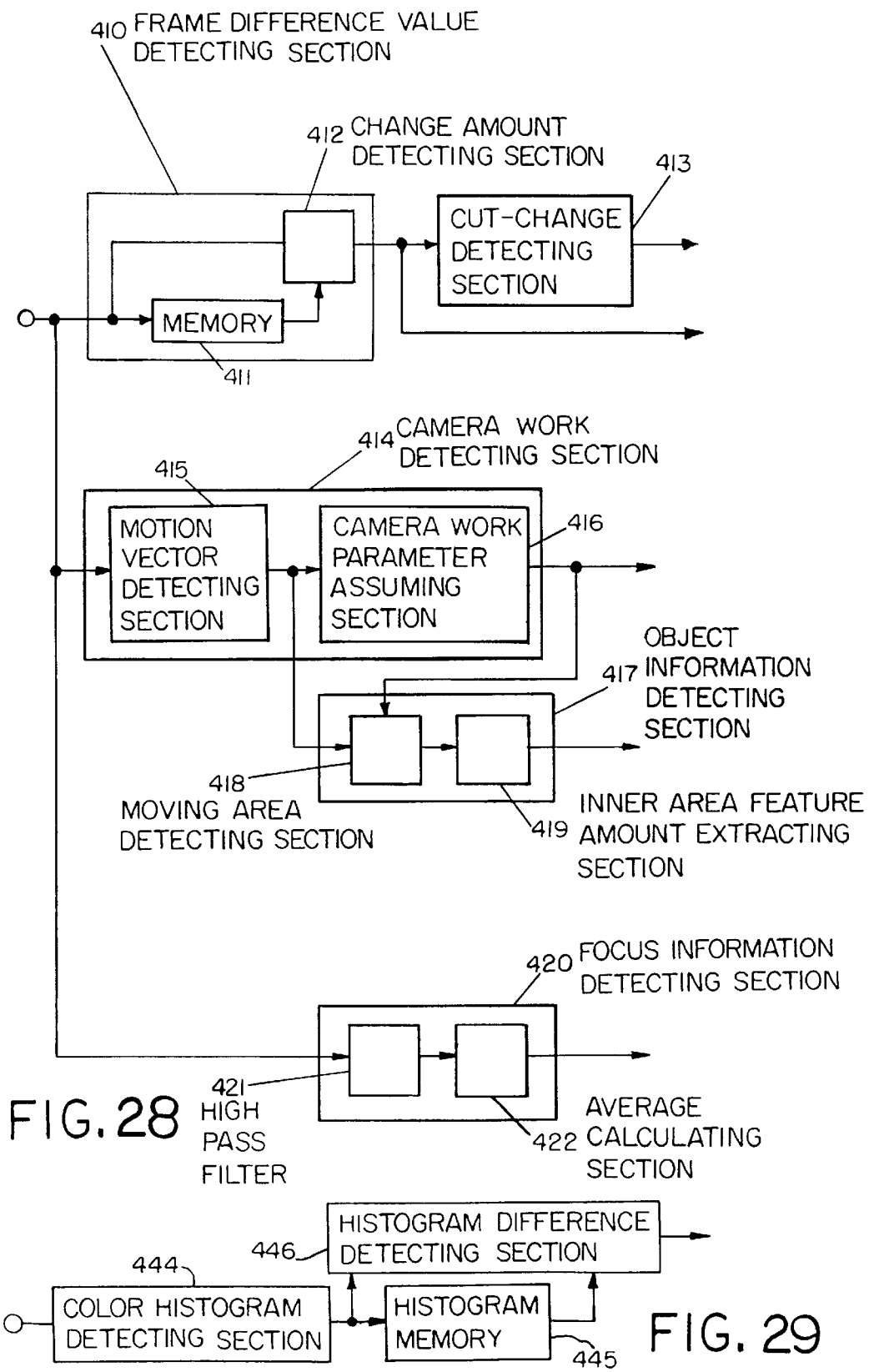
FIG. 28 shows a structure for a representative image information extracting section according to an ninth example of the present invention.
FIG. 29 is a block diagram showing another structure for a frame difference value detecting section shown in FIG. 28.

FIG. 28 shows a part of a configuration of an apparatus for generating a digest of a moving image according to the ninth example of the present invention. This part is a circuit for acquiring information for extracting a representative image from a video signal instead of reading the information from a recording medium.

As is shown in FIG. 28, the circuit includes a cut-change detecting section 413, a camera work detecting section 414, an object information detecting section 417 and a focus information detecting section 420. The frame difference value detecting section 410 includes a memory 411 and a change amount detecting section 412. The camera work detecting section 414 includes a motion vector detecting section 415 and a camera work parameter assuming section 416. The object information detecting section 417 includes a moving area detecting section 418 and an inner area feature amount extracting section 419. The focus information detecting section 420 includes a high pass filter 421 and an average calculating section 422.

The operation of the above respective sections will be described in detail.

First, the operations of the frame difference value detecting section 410 and the cut-change detecting section 413 will be described. The frame difference value detecting section 410 includes a memory 411 for delaying a moving image signal by one frame, and a change amount detecting section 412 for determining a difference value of moving image signals between the respective successive frames. The frame difference value detecting section 410 calculates the difference in a signal between the frames for each of corresponding pixels and sum up the difference over all corresponding pixels, and outputs the summed up difference as a frame difference value. To determine the difference value, a luminance value, rgb value can be used.

The cut-change detecting section 413 compares the frame difference value with a threshold value, and Judges that a cut-change occurs when the frame difference value exceeds the threshold value. This is because the frame difference value is higher as the contents of images between successive frames is changed more drastically. A video camera causes a cut-change when the recording start operation is made, so that the recording start operation can be assumed by detecting the cut-change from the image signal. The cut-change detecting section 413 outputs a recording start operation information at a time when it is detected that the frame difference value is larger than the threshold value. The structure of the frame difference value detecting section 410 mentioned above is only one example. For example, the frame difference value detecting section 410 may have the structure shown in FIG. 29.

In FIG. 29, the frame difference value detecting section 410 includes a color histogram detecting section 444 for determining a color histogram per frame of the moving image signal, a histogram memory 445 for storing the determined histogram, and a histogram difference detecting section 446 for detecting a difference of color histograms between the respective two successive frames. According to the structure shown in FIG. 29, the frame difference value is not compared with the threshold value per pixel but it is compared with the threshold value per frame. In addition, when a screen is divided into a plurality of blocks, the frame difference value can be compared with the threshold value per block.

The operation of the camera work detecting section 414 is the same as that of the camera operation assuming section 305 of the apparatus for generating a digest of a moving image according to the sixth example, so that the description thereof is omitted.

Next, the operation of the object information detecting section 417 will be described. The object information detecting section 417 extracts object information such as a position, a size and a color of the object while the video camera is tracking the object. When the camera work detecting section 414 detects a panning operation, and the moving area detecting section 418 detects a moving area, then the inner area feature amount extracting section 419 extracts a feature amount in the detected moving area.

The operation of the moving area detecting section 418 will be described below in detail.

Motion vectors $v_{i,j}$ at respective lattice points in the screen detected by a motion vector detecting section 415, and a motion vector $v_p$ due to the panning operation detected by the camera work detecting section 414 are input to the moving area detecting section 418. The moving area detecting section 418 extracts lattice points satisfying the following equation (9), and extracts an area different from that of the motion vector $v_p$ due to the panning operation based on a connecting relationship between the extracted lattice points:

$$|v_{i,j} - V_p| > \varepsilon \quad \text{wherein, } \varepsilon \text{ is a prescribed value.} \tag{9}$$

The inner area feature amount extracting suction 419 extracts a center, a dimension and color of the area as an inner feature amount from the area detected by the moving area detecting section 418.

Next, the operation of the focus information detecting section 420 will be described. The focus information detecting section 420 detects an out-of-focus state of the image based on an amount of the high frequency components of the image. The value of the high frequency components of the video signal becomes smaller in the out-of-focus state. The high pass filter 421 picks up the high frequency components of the image, and the average calculating section 422 determines an average value of the high frequency components included in the entire screen or in a prescribed region of the screen.

Thus, it is possible to acquire information for extracting a representative image by processing the video signal as is described above. Even though a γ correction value, color temperature, backlight and excessive light state, and the light intensity from an object are not mentioned in the present example, but such information can also be acquired by processing the video signal in the same manner. After the information for extracting the representative image is acquired, the representative image is extracted on the basis of the thus acquired information in a manner similar to that of the eighth example.

According to the apparatus mentioned above, the representative image extracting information is acquired on the basis of the video signal read out from the recording medium when the information for extracting the representative image is absent in the recording medium. However, it is also possible to acquire the representative image extracting information on the basis of the video signal received from an imaging element during the recording of a moving image. In this case, the device has the same structure as that of FIG. 28. Needless to say, but it is not necessary to acquire the representative image extracting information from the video signal in the case where there is the representative image extracting information capable of being detected by a sensor provided in the video camera Furthermore, the representative image extracting information acquired during the recording of a moving image may be recorded into the recording medium together with the video signal.

EXAMPLE 10

Figure 30:
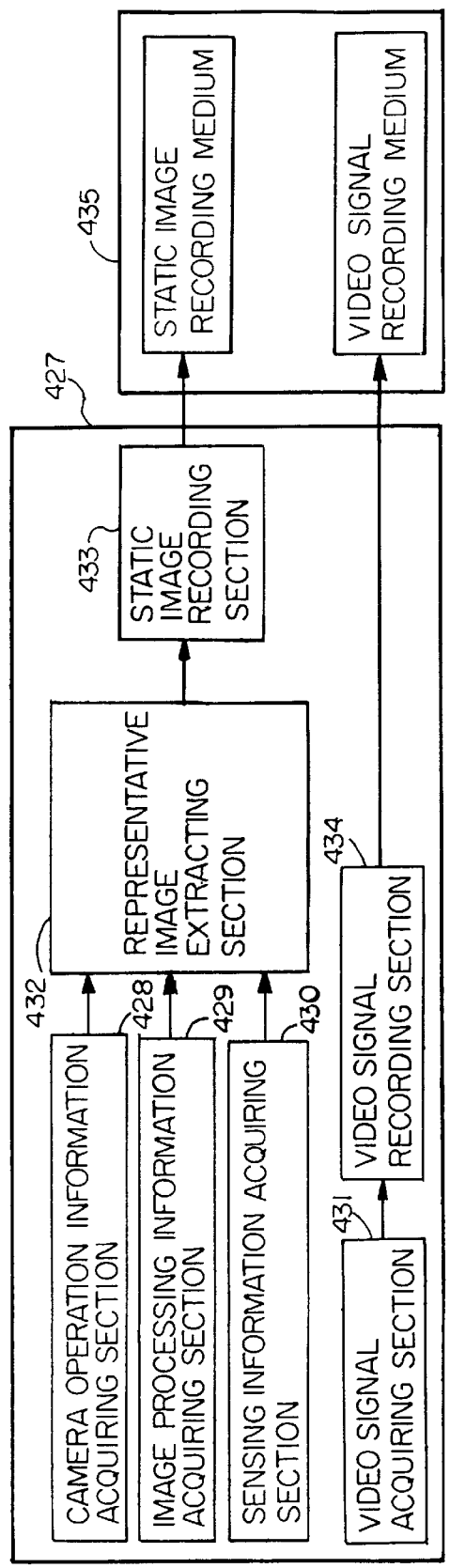
FIG. 30 shows a structure for an apparatus for recording a moving image according to a tenth example of the present invention.

FIG. 30 shows a configuration of an apparatus 427 for recording a moving image in a recording medium according to a tenth example of the present invention. In the present example, the apparatus 427 is incorporated in a video camera. The apparatus 427 determines a static image to be extracted as a representative image during the recording of a moving image, and records information for the static image and a video signal into a recording medium.

As is shown in FIG. 30, the apparatus 427 includes a camera operation information acquiring section 428, an image processing information acquiring section 429, a sensing information acquiring section 430, a video signal acquiring section 431, a representative image extracting section 432, a static image recording section 433, and a video signal recording section 434. However, it is not necessary for the apparatus to include all of the camera operation information acquiring section 428, the image processing information acquiring section 429 and the sensing information acquiring section 430. The apparatus may include at least one of the camera operation information acquiring section 428 and the image processing information acquiring section 429.

The operation of the above respective sections will be described below.

The camera operation information acquiring section 428 acquires information on the recording start operation and zooming operation during the recording of a moving image. The information on the recording start operation means information indicating the point of the recording start by marking the point with a flag. The information on the zooming operation means information indicating a rate of the zooming. Both the information on the recording start operation and the zooming operation can be detected on the basis of the button operations of the video camera.

The image processing information acquiring section 429 acquires information obtained by processing the video signal imaged by an imaging element. The image processing information includes, for example, the frequency and the size of the high frequency component of a video signal determined to perform the focus control; the difference value between the frames in luminance signals and color signals; the position and the size of an object region extracted from the video signal; the backlight state and too excessive light state; γ correction value; and the color temperature.

The sensing information acquiring section 430 acquires information obtained by detecting the state of the camera during the recording of the moving image by the use of any sensor. The sensing information includes, for example, camera movement due to the panning operation detected by an angular speed sensor, or light intensity from an object detected by a light intensity sensor, an opening degree of the diaphragm of the lens detected by an aperture opening sensor, and a focus distance detected by a lens location detector.

The representative image extracting section 432 detects the time period from the recording start to the recording end based on at least one of the camera operation information and the image processing information. For example, the recording start operation information included in the camera operation information is used to detect the point of the recording start. Next, on the basis of at least one of the camera operation information excluding the recording start operation information; the image processing information; and the sensing information; the representative image extracting section 432 evaluates whether an image included in each cut is suitable as a representative image for the cut. Information on an image evaluated to be suitable for the representative image for the cut is recorded in a static image recording medium in the recording medium 435 by the static image recording section 433. The operation of the representative image extracting section 432 will be described later in detail.

Hereinafter, the static image information which is recorded in the recording medium 435 by the static image recording section 433 will be further described. The static image information includes a static image itself which is judged to be appropriate as the representative image by the representative image extracting section 432, an image processed by an image process such as a reduction, information indicating a position at which the static image is recorded on the recording medium, or a flag added to a moving image to mark a position of the static image in the moving image.

In the case where the static image information is the static image itself, or a reduced image, the static image or the reduced image is recorded at a position different from a position at which the moving image is recorded by the video signal acquiring section 431 and the video signal recording section 434. Alternatively, the static image or the reduced image is recorded into a recording medium other than a record medium in which the moving image is recorded. For example, in the case where the recording medium is a video tape, only the static image information (i.e. the static image or the reduced image) is recorded into a top portion or an end portion of the video tape. Alternatively, only the static image information is recorded into an IC memory provided separately from the video tape.

In the case where the static image information is information indicating a position at which the static image is recorded on the recording medium, the static image information is recorded at a position different from the position at which the moving image is recorded by the video signal acquiring section 431 and the video signal recording section 434. Alternatively, the static image or the reduced image is recorded into a recording medium other than a record medium in which the moving image is recorded.

In the case where the static image information is a flag added to a moving image to mark a position of the static image in the moving image, the static image information is recorded at the same position as the position at which the moving image is recorded by the video signal acquiring section 431 and the video signal recording section 434. For example, the static image information is recorded at the top portion of the video signal to be recorded per frame unit.

As is described above, the video signal recorded by the video camera is recorded into the recording medium, and a representative image is extracted among the recorded moving images. Then, finally the static image information of the representative image is recorded into the record medium. Thus, it is possible to read out the recorded static image information and output the representative image to a display or a printer.

Hereinafter, it will be described how to extract a static image from the moving images and how to evaluate a static image in the representative image extracting section 406 shown in FIG. 27 and the representative image extracting section 432 shown in FIG. 30.

The representative image extracting sections 406 and 432 automatically extract a representative image as a static image from a plurality of images included in the moving image which are successively recorded during the period from the recording start to the recording end. Herein, the representative image is defined as an image selected based on the evaluation relative to the user's intent, the state of the recorded moving image and the state of the object.

The user's intent generally is reflected by the camera operation such as a zooming operation and a panning operation. Specifically, when a zooming-in operation is being made, the target object is assumed to be present in the screen, and therefore, the image at that time may be considered to be important. When a panning operation is being made, the scene to be recorded is assumed to be being changed to another one, and the image at that time may be considered to be unimportant. However, if a tracking object is present during the panning operation, the image may be considered to be important. Thus, the user's intent is preferably assumed from camera work so that important images can be extracted as representative images.

The state of the recorded moving image means a state such as an out-of-focus state due to a misoperation of the focus control during the recording of a moving image, an excessive light or backlight state due to a misoperation of the iris control, a state where γ correction cannot be performed properly; or a state where the aperture and/or the focus is adjusted. Such a state of the image can be judged on the basis of the information on the focus control and/or the iris control during the recording of a moving image or information on a γ correction value. Even if such information is not available, the state of the image can be obtained by processing the video signal. Thus, by evaluating the state of the respective images, images having a good state are preferably extracted as the representative images.

The state of an object means the location and/or size of the object, the state of an obstacle when the obstacle (a person or the like) passes through the scene, a state where a flashlight or the like is snapped, or a state where the object is spotlighted. In view of such a state, for example, an image where the object is located at the center, the size of the object is large, and/or no obstacle is present is preferably selected as the representative image. An image where the flashlight is snapped is preferably not selected as a representative image. An image where the object is spotlighted is preferably selected as the representative image.

The position and the dimension of the object are detected in the same manner as described in the ninth example with respect to the object information detecting section 417 of FIG. 28. The flashlight and the obstacle are detected on the basis of a frame difference value determined by the frame difference value detecting section 410 of FIG. 28. When the flashlight is snapped, the frame difference value is drastically changed, so that it is possible to detect whether the flashlight is snapped or not on the basis of a prescribed threshold value. On the other hand, when an obstacle is present, the frame difference value is changed from a frame where the obstacle enters to a frame where the obstacle goes out. Therefore, the obstacle is considered to be in the screen when the frame difference value exceeds the threshold value once and then exceeds it again in a prescribed period of time. In addition, it is possible to detect whether the object is spotlighted or not on the basis of the light intensity from the object.

Hereinafter, a method for extracting a representative image according to the above-mentioned principles.

Figure 31:
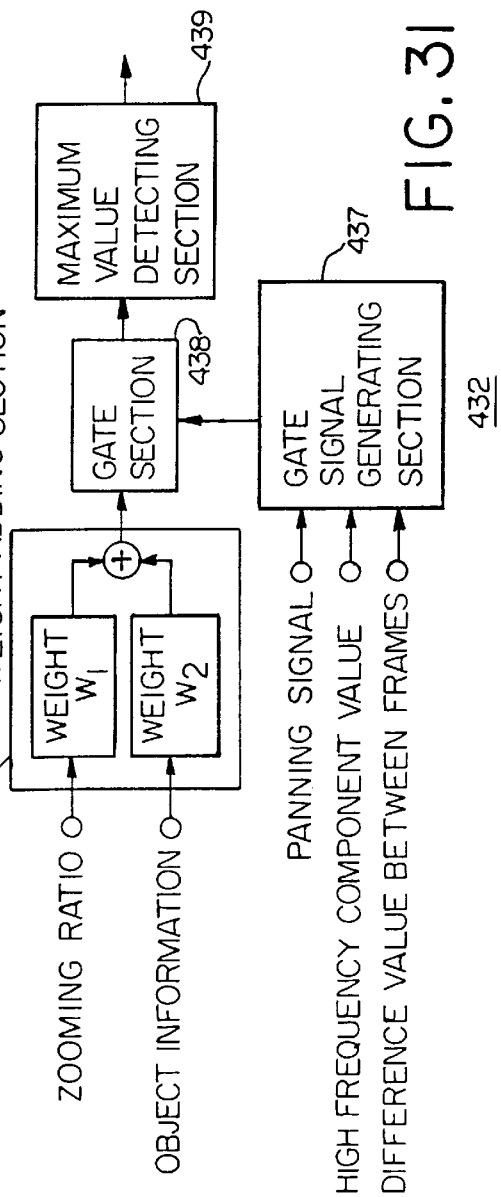
FIG. 31 shows a structure for a representative image extracting section according to a tenth example of the present invention.

FIG. 31 shows a configuration of the representative image extracting section 432. As is shown in FIG. 31, the representative image extracting section 432 includes a weight adding section 436, a gate signal generating section 437, a gate section 438, and a maximum value detecting section 439. A zooming ratio and the object information are input to the weight adding section 436, where the respective signals are weighed and added. Herein, the object information means information obtained by tracking the object by the camera, which is obtained on the basis of the position and the size of the object during the tracking operation. The object information has a larger value as the object is disposed nearer to the center of the camera and the size of the object becomes larger. The gate section 438 switches an on/off-state in response to a gate signal from the gate signal generating section 437. The maximum value detecting section 439 detects a maximum value among values which are input from the gate section 438.

The gate signal generating section 437 generates a gate signal on the basis of a panning signal, high frequency component value of a video signal, and a frame difference value or the like.

It will be described how to generate the gate signal with reference to FIGS. 32A through 32E. FIG. 32A show a waveform of a panning signal, which has a value of 0 during the panning operation, and has a value of 1 during the non-panning operation. FIG. 32B shows a waveform of a high frequency component value of the video signal, and the value becomes smaller as the image becomes out-of-focus. FIG. 32C shows a waveform of a binary signal obtained by digitizing the high frequency component value shown in FIG. 323 in accordance with the threshold value, and it is given a value of 0 if the high frequency component value is not more than the threshold value. FIG. 32D shows a waveform of the frame difference value. FIG. 32E shows a waveform of the value obtained by adjusting the frame difference value shown in FIG. 32D on the basis of the threshold value, and it is given a value of 0 if the frame difference value is not less than the threshold value. Moreover, if the frame difference value shown in FIG. 32D exceeds the threshold value once, and then exceeds it again within a prescribed period of time, the corresponding value of FIG. 32E maintains the value of 0 from the time when the frame difference value exceeds the threshold value to the time when it exceeds the threshold value again within the prescribed period of time. When the frame difference value shown in FIG. 32D exceeds the threshold value at only one time within the prescribed period of time, it is assumed that the image abnormally occurred by a flashlight or the like, so that the corresponding value of FIG. 32E will have the value of 0 only at that time. However, when the frame difference value shown in FIG. 32D exceeds the threshold value at a plurality of times, as such a case where the obstacle passes through the camera, it is assumed that the obstacle is present in the screen, so that the value of FIG. 32E remains at 0 during that time when the obstacle is considered to be present. By executing the AND operation for the binary three signals shown in FIGS. 32A, 32C and 32E, the gate signal is generated.

Thus, according to the structure shown in FIG. 31, by extracting an image which has a maximum evaluation value as a representative image, it is possible to extract images where the object is zoomed-in, and/or the object is center-located among images excluding images recorded during the panning operation, the out of focused images, and the images where the flash light and/or the obstacle is present. The maximum value detecting section 439 may detect the maximum value from the entire cut, or from a plurality of portions included in the cut.

In the present example, one evaluation value is determined by the weight adding section 436, the gate signal generating section 437, and the gate section 438 on the basis of a plurality of input signals. However, the present example is not limited to the above structure, but the evaluation value can be determined according to fuzzy inference rules or neural network rules.

In the present example, information as to the γ correction value, the light intensity from the object, the backlight or excessive light state, aperture opening, and/or focus length is not described, but such information may also be utilized in the present example. The gate signal can be generated so that images which are recorded when the γ correction value, the aperture opening, and/or the focus length fluctuate, and images having the backlight or excessive light state are not extracted as the representative images. In addition, it can be detected whether the object is spotlighted or not on the basis of the light intensity from the object, so that the evaluation value may be set higher when it is detected that the object is spotlighted.

In the present example, the evaluation is performed with respect to all the moving images during a period from the recording start to the recording end, and then the representative images are extracted. However, the evaluation may be performed with respect to only the images after a prescribed period of time after the recording start, and then the images where prescribed conditions are satisfied may be extracted as the representative images. Such a structure will be described below.

FIG. 33 shows another configuration of the representative image extracting section. As is shown in FIG. 33, the representative image extracting section includes a timer 440, a gate section 441, and an evaluating section 442. The timer 440 determines an elapsed period of time from the recording start, and generates a gate signal so that the gate of the gate section 441 is opened when a prescribed period of time elapses after the recording start. The evaluating section 442 evaluates whether the high frequency component value of the focus which passed through the gate section 441, and the frame difference value satisfy prescribed conditions or not. The prescribed conditions in the evaluating section 442 are that the high frequency component value of the focus is not less than a threshold value, and the frame difference value is not more than a threshold value. The evaluating section 442 stops the evaluation process at the time when the conditions are satisfied, and extract a static image satisfying the prescribed conditions as a representative image.

In the present example, only the high frequency component value of the focus and the frame difference value are used in the evaluation process, but the other signals such as panning and zooming signals may also be used.

FIG. 34 shows another configuration of the representative image extracting section. In FIGS. 33 and 34, like reference characters refer to like parts throughout, and the description thereof will be omitted.

In the present example, the evaluation is performed on the basis of the number of images obtained by multiplying the number of images which are recorded during the period from the recording start to the recording end by a prescribed rate, and then images satisfying the prescribed conditions are extracted as the representative images. According to the structure shown in FIG. 34, images after an intermediate frame are evaluated. An intermediate frame detecting section 443 detects an intermediate frame of the frames which are recorded during the period from the recording start to the recording end, and generates a gate signal so that the gate of a gate section 441 is opened at the time when the intermediate frame is detected. The operations of the gate section 441 and the evaluating section 442 are the same as those shown in FIG. 33, so that the description thereof is omitted.

As is described above, the recording medium of the present invention includes the moving image management information capable of readily managing the contents of the moving image, so that the user can easily search a desired scene.

In addition, according to the apparatus for recording the moving image of the present invention, a cut-change image is automatically detected among the moving image recorded into the recording medium. Then, recording addresses on the recording medium where the cut-change image is recorded, a time length of the respective cuts and a change degree of the moving image in the respective cuts are automatically recorded as a management information for managing the moving image, so that the management information can automatically be supplied even for a large amount of moving image data.

Moreover, the apparatus for generating the digest of the moving image of the present invention can automatically generate the digest image for a rapid traverse operation suitable for the contents of the recorded moving image, on the basis of the time length for the digest input by the user, and the management information recorded into the recording medium.

Furthermore, according to the system for generating the digest of the moving image, and the method for generating the digest of the moving image of the present invention, the state of the respective images can be assumed on the basis of button input signals, and a priority of the respective images is determined in accordance with the assumed state of the respective images. Then, on the basis of the thus determined priority, digest images are selected and a display speed is adjusted. Consequently, the digest to reflect the user's intent during the recording of the moving image can be displayed so that the contents of the moving image can readily be grasped.

Furthermore, by automatically determining the priority from the button input signals, the contents of the moving image can readily be grasped without any manual operation for previously assigning the priority and without any manual operation for determining the priority in reproducing the moving image, so that one can grasp the contents of the moving image by a simple operation as well as a rapid traverse operation.

In addition, according to the apparatus for generating the digest of the moving image of the present invention, the camera operation during recording operations such as a zooming operation and a panning operation can be assumed from a video signal. Then, display images are selected on the basis of the thus assumed camera operation. Accordingly, the digest to reflect the user's intent during the recording of the moving image can be displayed so that the contents of the moving image can readily be grasped.

Furthermore, by automatically selecting the display images on the basis of the video signal, the contents of the moving image can readily be grasped without any manual operation for previously assigning the priority without any manual operation for determining the priority in reproducing the moving image, so that one can grasp the contents of the moving image by a simple operation as well as a rapid traverse operation.

Moreover, the recording medium of the present invention includes image extracting information, thereby readily extracting representative images from the moving image recorded into the recording medium on the basis of the image extracting information.

Furthermore, the apparatus for generating the digest of the moving image, and the method for generating the digest of the moving image of the present invention can extract static images as the representative images from the moving image on the basis of the image extracting information. With the static images, the contents of the moving image can efficiently and briefly be grasped.

Furthermore, according to the apparatus for recording the moving image of the present invention, a video signal can be recorded in the recording medium, and representative images are extracted from the moving image. Then, static image information of the representative images is recorded into the recording medium, and consequently the recorded static image information is read out so as to be output by a display or a printer at high speed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for automatically generating a digest comprised of at least one still image of a moving image, said apparatus comprising:

a first receiving means for receiving video signals corresponding to a moving image including a plurality of automatically generated static images;

a second receiving means for receiving evaluating information including a camera operation information indicating a camera operation excluding a recording start operation made by an operator for the purpose of recording said moving image;

a static image extracting means for automatically extracting at least one static image from said plurality of static images included in said moving image, as a digest of said moving image, based on said evaluating information; and an output means for outputting said at least one static image extracted by said static image extracting means.

2. An apparatus according to claim 1, wherein said evaluating information further includes a sensing information indicating a recording condition of said moving image, and said static image extracting means extracts at least one static image from said plurality of static images included in said moving image based on said evaluating information.

3. An apparatus for recording a moving image onto a recording medium, said apparatus comprising:

a first generating means for generating video signals corresponding to a moving image and for automatically generating a plurality of static images corresponding to said moving image;

a second generating means for generating evaluating information including a camera operation information indicating a camera operation excluding a recording start operation made by an operator for the purpose of recording said moving image;

a specifying means for automatically specifying at least one static image of said plurality of static images included in said moving image based on said evaluating information, and for generating information indicating said specified at least one static image; and a recording means for recording said video signals corresponding to said moving image and said information indicating said specified at least one static image onto a recording medium.

4. An apparatus according to claim 3, wherein said evaluating information further includes a sensing information indicating a recording condition of said moving image, and said specifying means specifies at least one static image of said plurality of static images included in said moving image based on said evaluating information.

5. A method for automatically generating a digest of a moving image, comprising the steps of:

receiving video signals corresponding to a moving image including a plurality of static images;

receiving evaluating information including a camera operation information indicating a camera operation excluding a recording start operation made by an operator for the purpose of recording said moving image;

extracting at least one static image from said plurality of static images included in said moving image, as a digest of said moving image, based on said evaluating information; and outputting said extracted at least one static image.

6. A method according to claim 5, wherein said evaluating information further includes a sensing information indicating a recording condition of said moving image, and said extracting step includes extracting at least one static image from said plurality of static images included in said moving image based on said evaluating information.

* * * * *